United States Patent [19]

Inamura

[11] 3,871,579

[45] Mar. 18, 1975

[54] APPARATUS FOR DISPLAYING ISODOSE CURVES OF RADIATION WITH PROGRAM FOR DIGITAL COMPUTER COUPLED THERETO DETERMINED IN RELATION TO SOURCE OF RADIATION

[76] Inventor: Kiyonari Inamura, c/0 Nippon Electric Co. Limited, 7-15, Shiba Gochome, Tokyo, Japan

[22] Filed: Feb. 2, 1973

[21] Appl. No.: 329,192

Related U.S. Application Data

[63] Continuation-in-part of Ser. Nos. 157,587, June 28, 1971, abandoned, Ser. No. 877,832, Nov. 18, 1969, abandoned.

[30] Foreign Application Priority Data

Nov. 20, 1968 Japan ................................ 43-84469

[52] U.S. Cl......... 235/198, 178/DIG. 22, 235/151.3, 340/324 A

[51] Int. Cl. ............................................ G06f 15/42

[58] Field of Search................. 235/151.3, 197, 198; 340/172.5, 324 A; 178/6.8, DIG. 22; 250/505–513; 444/1

[56] References Cited

UNITED STATES PATENTS

| | | | |
|---|---|---|---|
| 3,292,154 | 12/1966 | Simmons | 340/172.5 |
| 3,336,587 | 8/1967 | Brown | 340/324 A |
| 3,346,853 | 10/1967 | Koster | 240/172.5 |
| 3,453,384 | 7/1969 | Donner et al. | 178/6.8 |
| 3,549,885 | 12/1970 | Anderson | 250/513 |

*Primary Examiner*—Felix D. Gruber
*Attorney, Agent, or Firm*—Marn & Jangarathis

[57] ABSTRACT

Apparatus for displaying isodose curves of radiation to be absorbed by an object comprises an input device and a display output device which are to be coupled to a digital computer. The input device produces digital signals representative of parameters for calculation to be effected by the computer and of operating parameters for a selected source of the radiation. Responsive to output signals derived from the digital signals by the computer in accordance with a program particular to the selected radiation source, the display output device visually displays the isodose curves.

10 Claims, 21 Drawing Figures

INVENTOR.
Kiyonari Inamura
BY
Marn & Jangarathis
ATTORNEYS

INVENTOR.
Kiyonari Inamura
BY
Mann & Jangarathis
ATTORNEYS

INVENTOR.
Kiyonari Inamura
BY
Marn & Jangarathis
ATTORNEYS

INVENTOR.
Kiyonari Inamura
BY
Marn & Jangarathis
ATTORNEYS

INVENTOR.
Kiyonari Inamura
BY
Marn & Jangarathis
ATTORNEYS

INVENTOR
Kiyonari Inamura

BY Marn & Jangarathis
ATTORNEYS

APPARATUS FOR DISPLAYING ISODOSE CURVES OF RADIATION WITH PROGRAM FOR DIGITAL COMPUTER COUPLED THERETO DETERMINED IN RELATION TO SOURCE OF RADIATION

CROSS-REFERENCE TO RELATED APPLICATIONS

This is a continuation-in-part application of my copending patent application Ser. No. 157,587 filed June 28, 1971, which is a continuation in part of my previous patent application Ser. No. 877,832 filed Nov. 18, 1969, and both now abandoned.

BACKGROUND OF THE INVENTION

This invention relates to apparatus for displaying isodose curves of radiation to be absorbed by an object. The apparatus is for use in operative combination with an electronic digital computer now available in the commercial market.

When radiation is applied to a target objective, it is desirable to have only a predetermined dosage of radiation absorbed by the object. This dosage should be distributed in a designated pattern. Thus, for example, in the radiotherapy art, where radiation is employed for therapeutic purposes, radiation must be applied in such a manner that the proper dose is absorbed by, say, a malignant tumor within the body of a patient and a minimal dose is absorbed by the patient's healthy organs. To accomplish this, various prior art radiation techniques have been developed, such as multi-portal irradiation from optimum angles, conventional rotation therapy, use of well-known wedge filters, and others. For effective employment of these techniques, it is necessary for a radiotherapist to determine various numerical data which give the desired distribution of radiation absorbed by the object and to apply radiation thereto in accordance with the determined numerical data. The numerical data are herein called "parameters" in view of the fact that the numerical values behave as parameters when the distribution of absorbed radiation is calculated according to the present invention.

The above-mentioned radiation distribution is conventionally represented by isodose curves. An isodose curve is a graphical perspective of a curve that represents a portion of an object that receives an equal amount of radiation. The isodose curves have heretofore been estimated by manual calculation. These estimations are based upon the data for the depth dose curve and the flatness curves (or the decrement curves) measured actually in a phantom for various irradiation field sizes. Inasmuch as the target objects of radiotherapy are living creatures, the phantom may, for example, be water put in a vessel adapted to measure the radiation at various points in the water. The radiation is directed to the phantom with a solid angle determined by the field size, with the beam axis perpendicular to the surface of the phantom. A depth dose curve represents the amount of radiation absorbed by the phantom versus the depth along the beam axis. A flatness curve represents the amount of radiation absorbed by the phantom versus the distance from the beam axis along a plane perpendicular to the beam axis. An attendant disadvantage with this method is that the time required to determine the isodose curves is usually excessive and, moreover, the estimated isodose curves are often not accurate enough for precise radiation treatment.

Accordingly, one prior art technique that has been proposed to avoid these disadvantages is to employ a multiple of standard isodose curves that have been measured in the phantom for a plurality of combinations of the parameters and to select a combination of the parameters so that the distribution of radiation to be actually applied to the object closely approximates a desired one of the standard isodose curves. However, practical utilization of this technique is acutely dependent upon the skill and experience of the particular technician. In addition, the optimum parameters are not easily determined for inflexible, standard isodose curves.

Thus, the desirability of incorporating a digital or an analog electronic computer for the accurate determination of the isodose curves is readily appreciated. A known system that employs an electronic digital computer to determine the isodose curves requires a separate computing program to be written for each combination of the parameters. Each program must be put into the computer by typing or record media punching at the input device. The determined isodose curves are displayed on a print-out device or an ink recorder. Hence, an inordinate amount of time is required to write the program, to input the data into the computer, and to determine the optimum parameters with reference to various permanent records of the isodose curves. Further, a large-scale, general purpose digital computer is too costly to be used solely for radiotherapy operations. A known system that employs an analog computer does not require an individualized program for determining the isodose curves for various combinations of the parameters, thereby decreasing the time required for calculation of the isodose curves. In addition, complex print-out devices and recording apparatus may be replaced by cathode-ray display means, enabling direct pictorial representation of the isodose curves. Moreover, the moderate cost of an analog computer is acceptable for use with present radiotherapy systems. However, the determination and display of the isodose curves by an analog computer are not as precise as those determined by a digital computer, and the analog computer is not well suited for permanent recording of the isodose curves. This makes it difficult to determine the treatment planning for multi-portal irradiation and the like radiation techniques which require a plurality of the parameter combinations to be selected. Accordingly, a special purpose digital computer system has been designed with the expectation of combining the benefits of the prior art digital and analog computer systems. This special purpose computer is known as "Programmed Console" and is described in detail by Tom. L. Gallagher in the "Proceedings for Conference on the Use of Computer in Radiology," 1966. Nevertheless, the above-mentioned disadvantages of the prior art computer systems are not satisfactorily eliminated because of the relative complexity of this system.

SUMMARY OF THE INVENTION

It is therefore an object of the present invention to provide an easily operable apparatus for displaying isodose curves of radiation to be absorbed by an object.

It is another object of the present invention to provide a high-speed apparatus for displaying the isodose curves in accordance with various combinations of the parameters for radiotherapy.

It is still another object of this invention to permit the determination in a very short time of the optimum parameters for radiotherapy in accordance with a displayed set of the isodose curves.

It is an additional object of the present invention to provide apparatus for giving permanent records of the optimum parameters in a very short time.

In accordance with the instant invention there is provided an apparatus comprising an input device and a display output device which are operatively coupled to an electronic digital computer. The apparatus is for use in displaying a predetermined number of isodose curves representative of the respective doses of radiation to be absorbed by a medium or an object. The isodose curves are displayed within an area of a coordinate plane which is preselected in the object and quantized by a preselected step size, such as a unit length of the abscissa and the ordinate or a half of the unit length. Thus, the isodose curves are displayed by discrete points at which the respective doses are to be absorbed by the object. The radiation is produced by a radiation source that is selected in consideration of the object to be irradiated and is placed at least at one preselected spatial relation relative to the area. In other words, the radiation source may either be embedded within the object or rotated around the object. In the manner known in the art, the radiation source is operative in accordance with a plurality of operating parameters. Responsive to input signals, the computer calculates the results prescribed by a program and produces output signals representative of the results in compliance with the program. According to this invention, first digital signals which are a portion of the input signals are representative of parameters for calculation, the parameters including the step size. The input device, responsive to the parameters for calculation set thereon manually or otherwise and to the operating parameters similarly set thereon, produces the first digital signals and second digital signals representative of the latter parameters. The first and the second digital signals are supplied to the computer as the input signals. The output signals produced in conformity with the program are now representative of the coordinates of the discrete points. It is to be stressed that the program for such calculation is particular to the source of radiation rather than to various factors other than the type of the radiation source as was the case with the prior art apparatus. Responsive to the output signals, the display output device visually displays the isodose curves. By varying the value of one or more operating parametrs, it is possible to determine an optimum set of operating parameters that gives isodose curves representative of desired distribution of radiation in the object. After the optimum set is determined, a permanent record output device operatively coupled to the computer may reproduce the isodose curves on a recording medium and print out the operating parameters of the optimum set.

DESCRIPTION OF THE PREFERRED EMBODIMENTS

Figure 1:
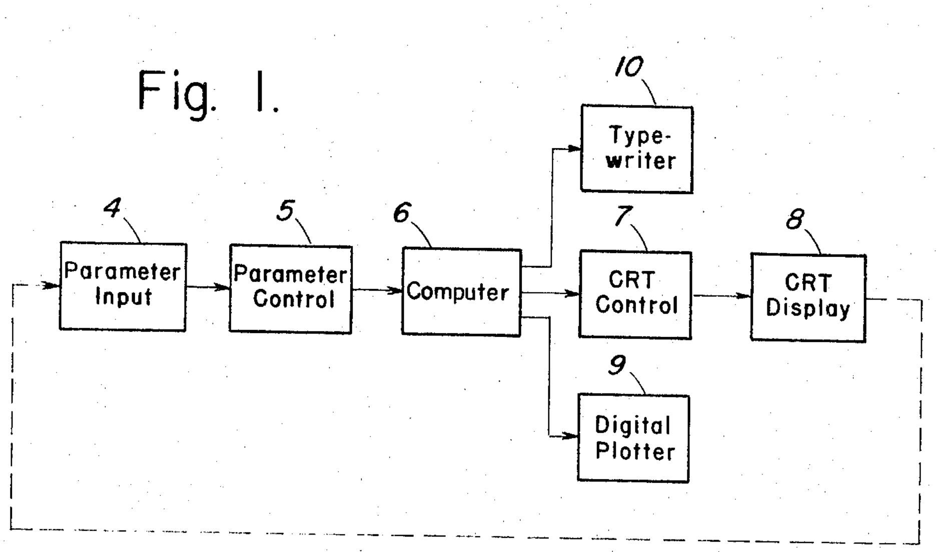
FIG. 1 shows a block diagram of an isodose curve displaying apparatus according to the present invention.

As will later be described in detail, a dose distribution or an isodose curve display apparatus according to this invention comprises at least one input device and CRT display output device, preferably equal in number to the input devices, and may further comprise at least one permanent record output device. The isodose curve display apparatus is for use in operative connection to an electronic digital computer and applicable to the linear accelerators for either X-rays or electron beams, the betatrons for either X-rays or electron beams, the rotatable or fixed cobalt or caesium therapy devices, the radium needles, and the like radiation source or radiation therapy devices. An input and a CRT display output device may be installed in each radiotherapy operation room of a hospital. A permanent record output device may be installed in one of the radiotherapy operation rooms or elsewhere in the hospital. The digital computer may be a NEAC 3100 of Nippon Electric Company, Tokyo, Japan, a 520i/620i of Varian Associates, a DDP 516 of Honeywell Incorporated, an IBM 1130 or 1800 of international Business Machines, or a like general purpose or a scientific digital computer having medium memory capacity (for example, 16 kilowords, 18 bits per word, and memory cycle of 2 microseconds) installed in the computer room of the hospital. Alternatively, the computer may be a large-scale computer installed in a certain computer center available through conventional on-line service. In the following, the invention 100, be described with particular reference to a NEAC 3100 computer. With an input device of this isodose curve display apparatus, it is possible to deal at a time with up the eleven parameters for treatment conditions or operating parameters for each of ten portals at most plus up to eight parameters for calculation common to the portals. The rotation therapy, such as carried out by a rotatable linear accelerator or a rotatable cobalt applicator, may be approximated by an optimal number of portals. The isodose curve display apparatus is capable of displaying seven isodose curves of 100, 90, 80, 70, 60, 50, and 40% of the maximum dose (or the tissue dose) either on the full scale or a half scale of the field or area of irradiation within about $5N + 1$ seconds, where $N$ represents the number of portals for which the parameters are actually set on the input device. An example of a set or combination of parameters to be set at the input device for a linear accelerator for X-rays is given below in Table 1 together with the allowable ranges.

Table 1

Parameters and their Allowable Ranges

TREATMENT CONDITIONS (for each of the Portals Nos. 1 through 10)

| Symbol | Name of Parameter | Allowable Range |
|---|---|---|
| r | Integrated Dose | 000 – 999 rads |
| $L_l$ $L_s$ | Field Size | 00.0 – 29.9 cm |
| d | Distance between Skin and Isocenter | 01.5 – 29.9 cm |
| D | Thickness of Body | 01.5 – 29.9 cm |
| $A_I$ | Irradiation Angle | 000 – 360 degrees |
| $A_W$ | Wedge Filter Angle | 0, ±15, ±30, ±45 degrees |
| $A_o$ | Oblique Incidence Angle | –89 – +90 degrees |
| h | Effectiveness of Shielding Block | –0.99 – 0.00 |
| $w_o$ | Width of Shielding Block | 0.00 – 30.8 cm |
| $P_o$ | Position of Shielding Block | –15.4 – +15.4 cm |

PARAMETERS FOR CALCULATION

| Symbol | Name of Parameter | Allowable Range |
|---|---|---|
| N | Number of Portals | 01 – 10 |
| $L_{l'}$ $L_{t'}$ | Scope of Calculation | 0.00 – 42.0 cm |
| $U_o$ $V_o$ | Origin of Calculation | –28.5 – +28.5 cm |
| dU and dV | Mesh Intervals | 2.5 or 5.0 mm |
| $r_o$ | Reference Dose of 100% | 0000 – 9999 rads |
| e | Sampling Band of the Curves | ±1, ±2, ±3, or ±4% |

Figures 10, 14:
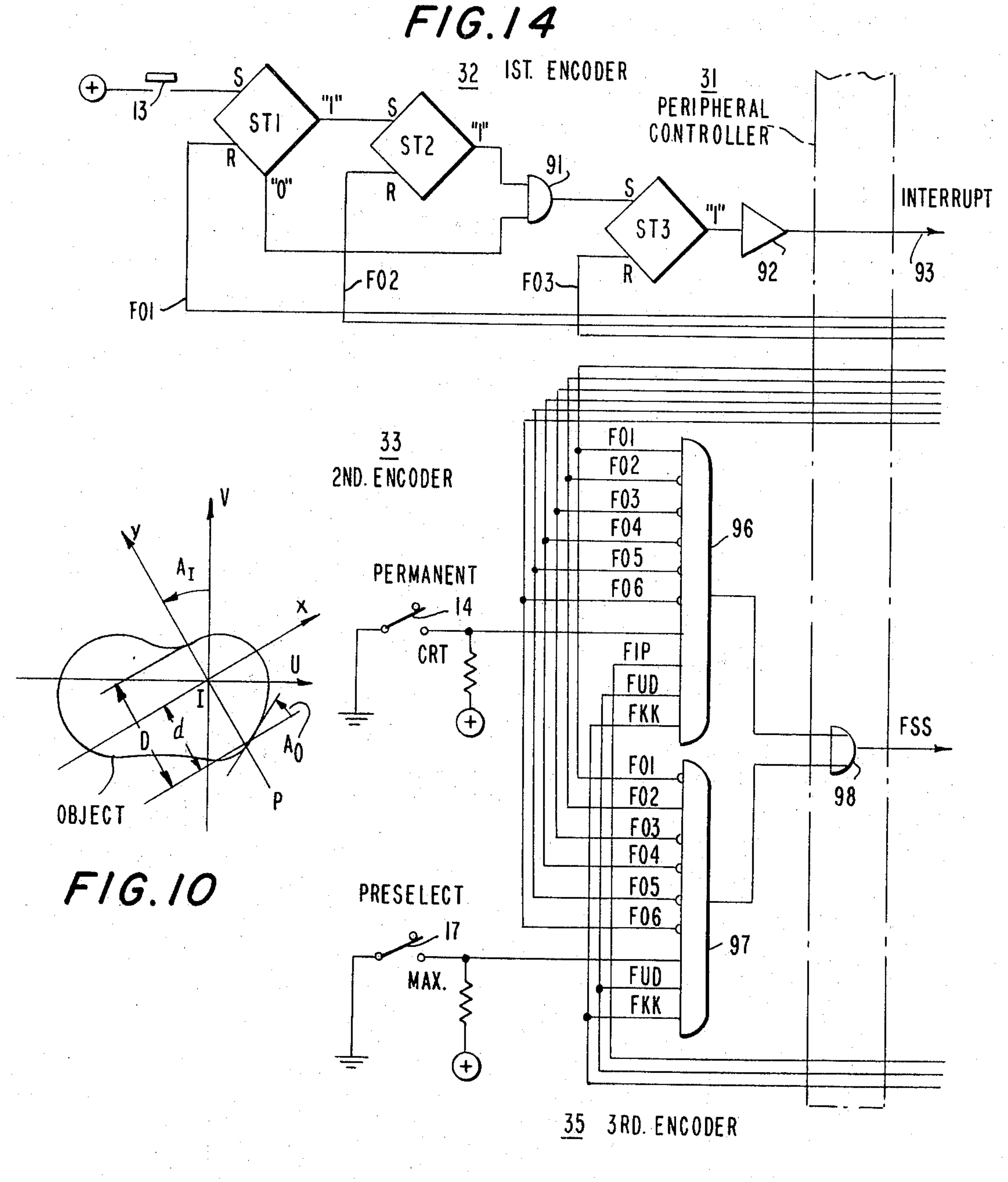
FIG. 10 shows a coordinate plane to be used for producing the display of the isodose curves by the apparatus and the computer operatively coupled thereto.
FIG. 14 shows other portions of the parameter input unit and the parameter input control unit.

Referring at first to FIG. 10, the U and the V coordinate axes are in a vertical plane passing through that isocenter I of an object to which the radiation is directed, with the origin placed at the isocenter I. The positive sense of the V axis is vertically upwards. In order to facilitate calculation of the coordinates of the isodose points, the $x$ and the $y$ coordinate axes are drawn on the U-V coordinate plane with the origin also placed at the isocenter I and with the $y$ axis entending along the beam axis. The $x$-$y$ and the U-V ccordinates are the righthand coordinate systems. The integrated dose $r$ for a portal P is the dose to be absorbed by the object during the whole duration of the therapy. The long and the short sides of the field to be irradiated $L_l$ and $L_s$ are selected for each portal in consideration of the spread of the malignant tumor detected by diagnosis and measurements. Distance $d$ between the skin, namely, the surface of the object, and the isocenter is the measure along the beam axis. The thickness D of the object is the measure along the beam axis. The irradiation angle $A_I$ is measured from the positive sense of the V axis to the positive sense of the $y$ axis and is given by the gantry angle. The oblique incidence angle $A_o$ is measured from the positive sense of the $x$ axis to the tangent to the skin surface at the point of incidence of the beam axis. The origin of calculation ($U_o$, $V_o$) represents the coordinates of the center of the area for calculation. The mesh intervals $d$U and $d$V are the step sizes for quantizing the points on the U-V plane, namely the U and the V components of the distance between the adjacent discrete isodose points which are used to depict each isodose curve. The reference dose (or the 100% dose) $r_o$ is set when it is desired to study the isodose curves of percentages other than the abovementioned percentages based on the maximum dose. The sampling band $e$ of the curves determines the range of doses to be represented by an isodose curve. For example, 80% isodose curve represents the discrete points which absorb from 7,110 rads to 7,290 rads when the maximum dose and the sampling band are 9,000 rads and ±1%, respectively. The 80% isodose curve represents the discrete points which absorb nominal dose of 80% when the reference dose is set at 8,500 rads. Incidentaly, the number of the portals is one of the treatment parameters, although shown in Table 1 as one of the parameters for calculation.

Other examples of the parameters are:

For linear accelerators:

- Angle of rotation of the source head about the beam axis,
- Angle of rotation of the patient support assembly, and
- Distance between the source and the isocenter;

For betatrons:

- Angle for swing of the source head,
- Distance between the source and the isocenter,
- Diameter of the irradiation field, and
- Kind of the electron beam scatterer;

For rotatable cobalt therapy;

Intensity of the replaced new source,
Date of replacement of the source,
Date of therapy, and
Duration of therapy; and For radium needles:

Length of the needle,
Diameter of the needle,
Position of embedding, and
Position of the cross-section.

For the computer, the program is independent of the values of the parameters and depends only on the type of the radiotherapy device, with the result that it is possible to process with the same program various combinations of the parameters for the radiotherapy devices of the type. Furthermore, neither typing nor punching of the parameters is necessary to provide the input data for the computer. Still further, the CRT display output device provides quick pictorial display of the results of calculation. These advantages of the apparatus according to this invention enable the optimum parameters to be determined by way of the trial and error processes (the sequential modification or the convergence method) and the permanent record output device to record the determined parameters on a recording medium for subsequent, repeated use. After the patent application for this invention was filed in Japan, utility of the apparatus was proved at the National Cancer Center Hospital of Japan.

Referring now to FIG. 1, the isodose curve display apparatus comprises a parameter input unit 4, a parameter input control unit 5, an electronic digital computer 6 operatively coupled to the input control unit 5, a CRT display control unit 7 operatively coupled to the computer 6, a CRT display unit 8, a digital plotter 9, and an input/output typewriter 10. The parameter input unit 4 and the parameter input control unit 5 are the input device mentioned above. Similarly, the CRT display unit 8 and the CRT display control unit 7 are the CRT display output device. The plotter 9 and the typewriter 10 are the permanent record output device, although the typewriter 10 may be used also as an input device for particular purposes.

As will later be described in detail, the parameter input unit 4 is provided with manually operable switches to be set in compliance with a combination of various values of the parameters to generate digital electric signals representative of the respective parameters. The computer 6 or its central processor carries out calculation of the coordinates of the isodose points for each particular combination of the parameters in compliance with the program stored in its main memory (not shown) for the calculation and, in compliance with the program effects the CRT display unit 8 to display the isodose curves for a given combination of the parameters on the fluorescent viewing screen. As the case may be, the computer 6, in compliance with the program, controls the plotter 9 and the typewriter 10 to record such curves and the given parameters. The parameter input control unit 5 and the CRT display control unit 7 which are preferably combined with the parameter input unit 4 and the CRT display unit 8 into an integral input device and a similar CRT display output device, respectively, serve as the interfaces between the latter units 4 and 8 and the central processor of the computer 6 As is often the case with the block diagrams of a computer system., the interfaces between the computer 6, on the one hand, and the plotter 9 and the typewriter 10, on the other hand, are not shown in FIG. 1.

Figure 2:
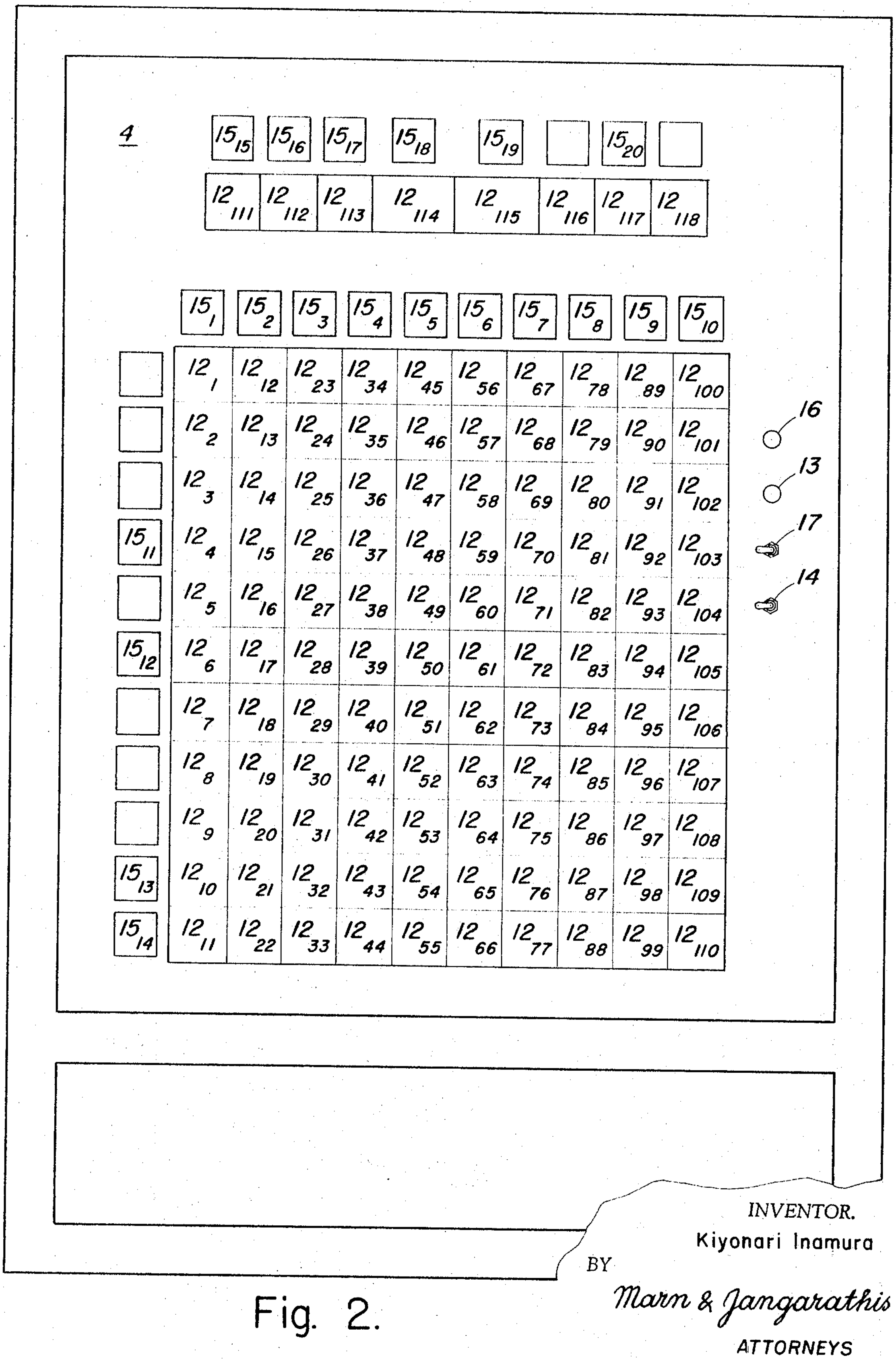
FIG. 2 is a front elevational view of a parameter input unit used in the apparatus shown in FIG. 1.

Referring to FIG. 2, the parameter input unit 4 comprises a matrix array of conventional digital or thumbwheel switches $12_1$ through $12_{110}$ comprising ten columns and eleven rows. The unit 4 further comprises an additional row of eight digital switches $12_{111}$ through $12_{118}$. With these digital switches $12_1$ through $12_{118}$, it is possible to represent the parameters given in Table 1. Each digital switch may comprise thumbwheels in correspondence with the possible maximum digits of the parameters assigned thereto. With the thumbwheels set at the respective decimal positions corresponding to the value of the parameter, each digital switch producer a digital electric signal representative of the parameter in binary coded decimal form. The digital switches $12_1$ through $12_{118}$ may be of any of the types sold by Digitran Company, U.S.A. By way of example, a combination of the parameters is given hereunder in Table 2 for a linear accelerator with no wedge filter and no shielding block. The unit 4 still further comprises a start pushbutton switch 13 for initiating operation of the computer 6 to calculate the isodose curves for a particular combination of the parameters set on the parameter input unit 4, a first selector switch 14 for selecting which of the output devices 8 and 9–10 should be used, a row of ten indicator lamps $15_1$ through $15_{10}$ aligned with the respective matrix columns of the digital switches $12_1$ through $12_{110}$ and accompanied by the descriptions (not shown) of the portal numbers, a column of eleven similar indicator lamps $15_{11}$ through $15_{14}$ and other, aligned with the respective rows of the digital switches $12_1$ through $12_{110}$ and accompanied by those description (not shown) of the respective treatment conditions which may be replaceable to comply with the particular radiotherapy device used, a further row of like indicator lamps $15_{15}$ through $15_{20}$ and others corresponding to the respective common parameter digital switches $12_{111}$ through $12_{118}$ and accompanied by the descriptions (not shown) of the respective parameters for calculation, a power source switch 16 for a combination of the parameter input and the CRT display output devices, and a second selector switch 17. The column and row indicator lamps $15_1$ through $15_{14}$ and others are lit in combination in the manner later described to indicate erroneous settings, if any, of the treatment conditions for the portals by the matrix digital switches $12_1$ through $12_{110}$. The additional row indicator lamps $15_{15}$ through $15_{20}$ and others are similarly lit to indicate erroneous setting of the parameters for calculation by the associated ones of the common parameter digital switches $12_{111}$ through $12_{118}$. The reference dose may be the maximum dose obtained in the manner later described as a result of calculation for the given combination of the parameters. Alternatively, the reference dose may be a preselected dose, which is set by one of the common parameter digital switches $12_{117}$ to make it possible to observe the isodose curves of the desired percentages. The second selector switch 17 is used to determine on which of the reference doses the calculation of the isodose curves should be based.

Table 2

| Examples of Parameters | | | | | | | | | | | |
|---|---|---|---|---|---|---|---|---|---|---|---|
| Number of Portals N | | | Date: Mar. 8, 1969 Scope $L_t$ $L_t$ | No.: 113074 Location $U_o$ $V_o$ | | Patient: So-and-so Mesh dU and dV | | Site: Brain Ref. Dose $r_o$ | | Curve e | |
| 10 | | | 20 20 | 0.0 | −5.0 | 0.25 | | | | ±3% | |
| Port. No. | i | 1 | 2 | 3 | 4 | 5 | 6 | 7 | 8 | 9 | 10 |
| Int. Dose | r | 100 | 100 | 100 | 100 | 100 | 100 | 100 | 100 | 100 | 100 |
| Field Size | $L_1$ | 5 | 5 | 5 | 5 | 5 | 5 | 5 | 5 | 5 | 5 |
| | $L_s$ | 5 | 5 | 5 | 5 | 5 | 5 | 5 | 5 | 5 | 5 |
| Skin | d | 11.4 | 9.1 | 7.4 | 6.8 | 6.0 | 5.7 | 6.1 | 6.8 | 7.2 | 10.0 |
| Body | D | 17.1 | 15.2 | 14.2 | 14.0 | 16.0 | 17.2 | 15.2 | 14.2 | 14.0 | 16.0 |
| Irrad. | $A_I$ | 0 | 36 | 72 | 108 | 144 | 180 | 216 | 252 | 288 | 324 |
| Wedge | $A_W$ | | | | | | | | | | |
| Oblique | $A_o$ | 0 | +30 | +13 | +8 | +10 | −10 | −12 | −4 | −18 | −25 |
| Efficiency | h | | | | | | | | | | |
| Width | wO | | | | | | | | | | |
| Position | PO | | | | | | | | | | |
| Maximum Dose: 787 rads | | | Comment: Rotation Therapy 360 degrees | | | | | | | | |

Figure 3:
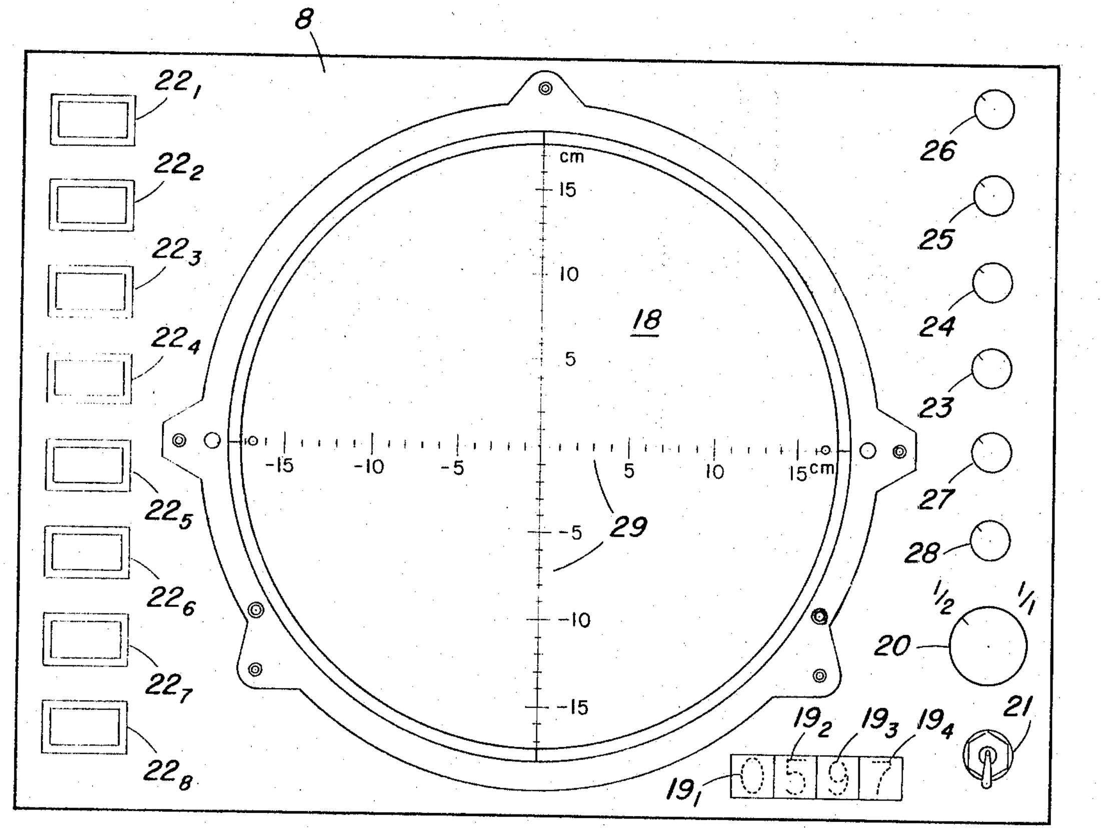
FIG. 3 is a front elevational view of a CRT display unit used in the apparatus.

Referring to FIG. 3 the CRT display unit 8 comprises a cathode-ray tube having a fluorescent screen 18 for displaying a set of the isodose curves, a set of numeral display tubes $19_1$ through $19_4$ for showing the maximum dose obtained as a result of calculation together fluorescent screen with the isodose curves, a scale switch 20 for interchanging the scale between the full scale and a half scale, a scale calibration switch 21 for interswitching between the isodose curves display and the scale calibration, a plurality of display intensifying pushbutton switches $22_1$ through $22_8$ accompanied by the respective descriptions (not shown) for selectively intensifying the brightness of the desired at least one of the displays of the isodose curves and the display of the isocenter for specific examination by the operator, a plurality of control knobs 23, 24, 25, and 26 for adjusting the U and the V axis positions of the display, the illumination, and the brightness in the manner known in the CRT oscilloscope, and two more control knobs 27 and 28 for the U and the V axis calibration. Preferably, the fluorescent screen 18 has an afterglow time of about 0.5 second and is sixteen inches in diameter which is large enough to display the actual size of an imaginary cross-section of the human body. The fluoroscent screene 18 is provided with scales 29 for showing the U and the V axes and the distance from the coordinate origin in centimeters.

Figure 4:
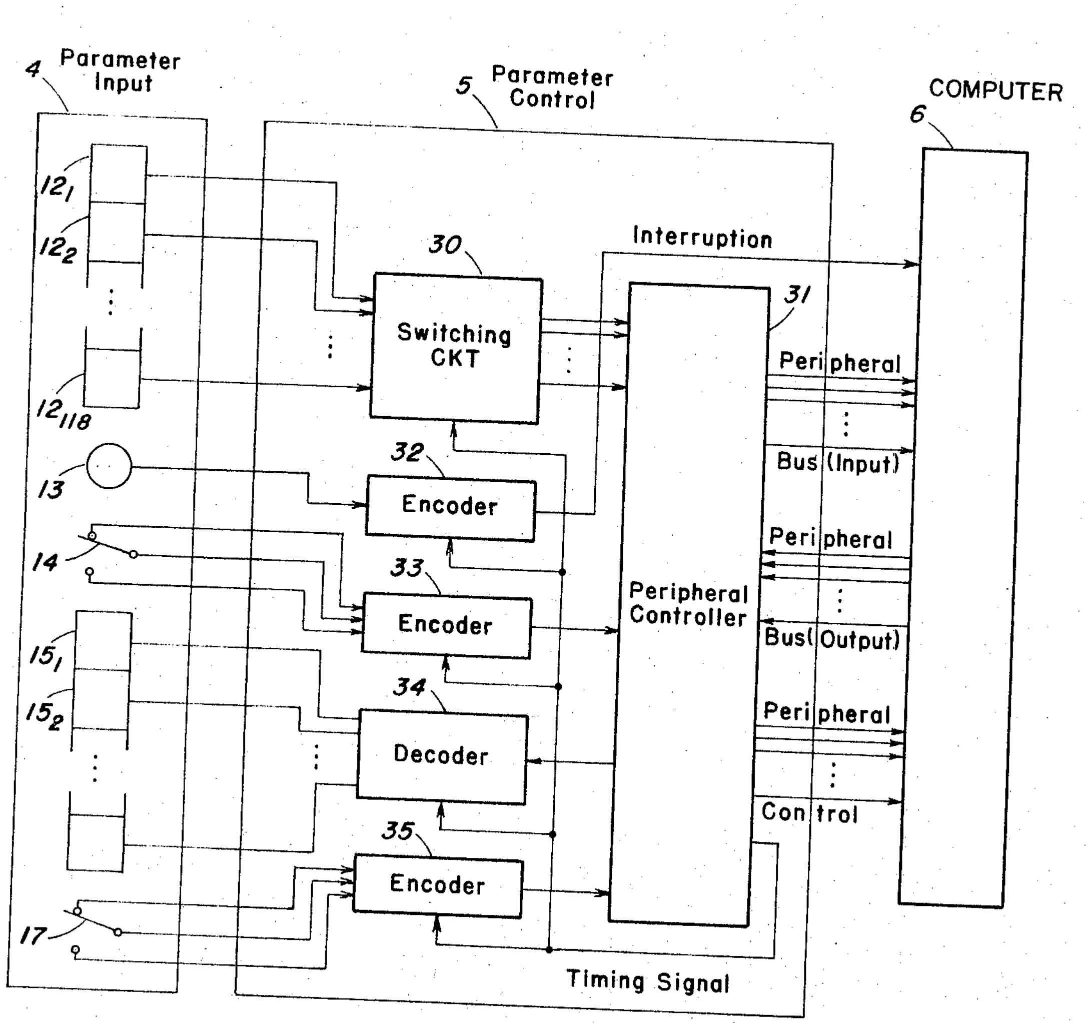
FIG. 4 is a block diagram of the parameter input unit and a parameter input control unit used in the apparatus.

Referring to FIG. 4, the parameter input control unit 5 comprises a switching circuit 30 and a peripheral controller 31 connected between the switching circuit 30 and the central processor of the computer 6. As will be described later in detail, the switching circuit 30 comprises AND gates connected to the respective digital switches $12_1$ through $12_{118}$ and supplied with the timing signals from the peripheral controller 31 for successively causing the digital signals of the binary coded decimal form to pass therethrough, thereby converting the space-shared digital signals into time-shared digital signals, which are sent through the peripheral controller 31 and the peripheral bus lines (input) to the central processor of the computer 6 as the data to be processed. The unit 5 further comprises a first and a second encoder 32 and 33 interposed between the start pushbutton switch 13 and the central processor of the computer 6 and between the first selector switch 14 and the peripheral controller 31, respectively. Responsive to operation of the start pushbutton switch 13, the first encoder 32 encodes the positive signal supplied thereto through the switch 13 into an interruption signal known in the art for the computer 6. Supplied with the timing signals and one or the other of output device selection signals, the second encoder 33 sends either of the latter signals through the peripheral controller 31 and the peripheral control lines to the computer 6 to make the same deliver the result of the data processing to the selected onè of the output devices 8 and 9–10. The unit 5 still further comprises a decoder 34 interposed between the peripheral controller 31 and the indicator lamps $15_1$ through $15_{20}$ and others and supplies with the timing signals. As will also be described below, the computer 6, after put into operation for calculation of the radiation distribution and supplied with the time-shared digital signals, checks the latter signals with reference to the allowable ranges set therein by the program and sends an encoded error signal through the peripheral bus lines (output) back to the peripheral controller 31 when the value of at least one parameter set by the corresponding digital switch falls outside of the allowable range therefor. The peripheral controller 31 sends the encoded error signal to the decoder 34, which decodes the encoded error signal and distributes the decoded signal to turn at least one of the combinations of the column and row indicator lamps $15_1$ through $15_{14}$ and others and the additional row indicator lamps $15_{15}$ through $15_{20}$ and others according to the parameter which is in error. The unit 5 yet further comprises a third encoder 35 interposed between the second selector switch 17 and the peripheral controller 31 and supplied with the timing signals for producing a reference dose selection signal encoded in the manner prescribed for operation of the computer 6.

Figure 5:
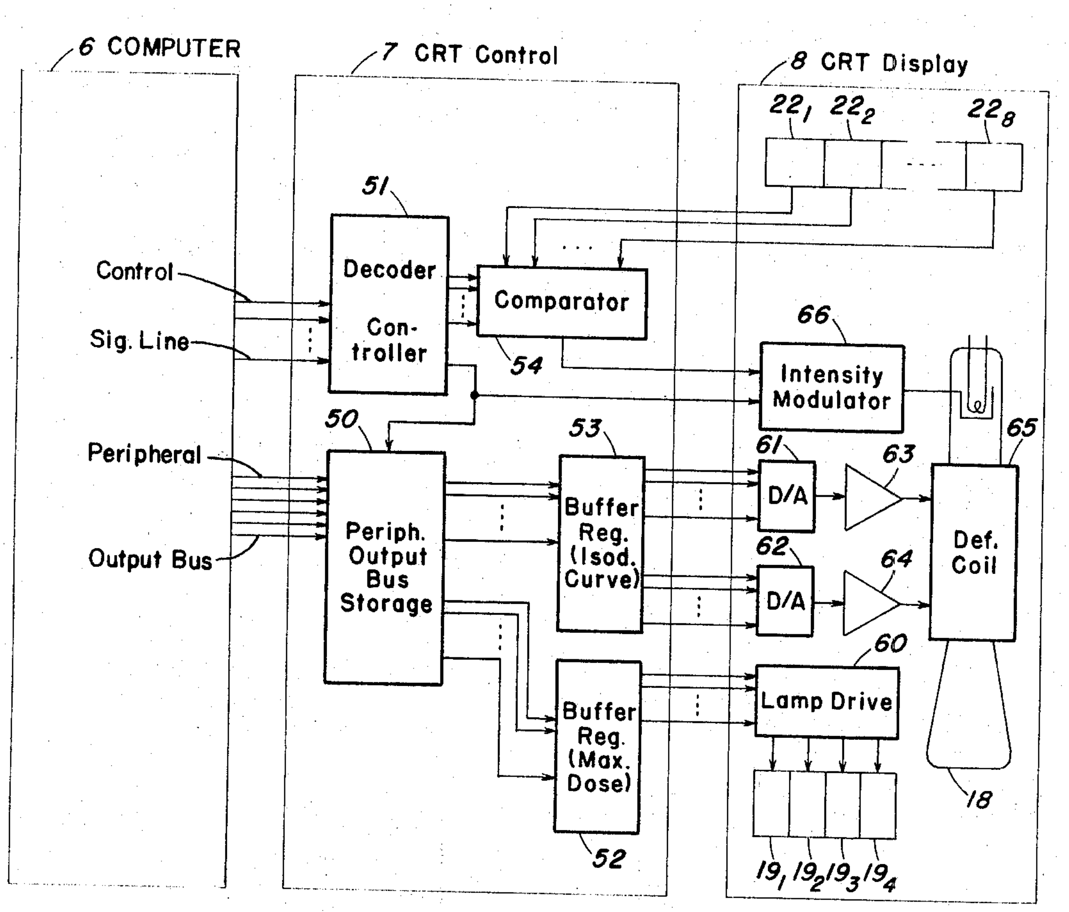
FIG. 5 is a block diagram of a CRT display control unit used in the apparatus and of the CRT display unit.

Referring further to FIG. 5, the CRT display control unit 7 comprises a peripheral output bus storage 50 for storing the data output signals supplied through the peripheral output bus for a short period of time, such as a few microseconds, a decoder/controller 51 responsive to the display control signals supplied through the control signal lines for successively producing control signals, a buffer register 52 for the maximum dose for storing the data output signals representative of the maximum dose in compliance with application to the storage 50 of the control signal therefor until the pushbutton switch 13 is depressed anew to start calculation for a new combination of the parameters, another buffer register 53 for the isodose curves for storing for a short period of time, such as a few microseconds, the data output signal representative of the coordinate components in compliance with application to the storage 50 of the control signals therefor, and a comparator 54 for comparing the successively produced percentage/isocenter signals with the signals, if any, produced by depression of desired at least one of the intensifying pushbutton switches $22_1$ through $22_8$ as desired to produce a display intensifying signal each time there is a counterpart of the percentage/isocenter signal in the latter signals. The blocks 50, 51, 52, 53, and 54 are combinations of several logic circuits and will be later described in detail. It should be noted here that the CRT display control unit 7 does not comprise cyclical storage devices, such as the recirculating delay line buffer.

Referring still further to FIG. 5, the CRT display unit 8 utilizes random scanning techniques rather than periodical scanning techniques which are commonly used in CRT displays for television and data terminals. The CRT display unit 8 thus comprises a lamp driver 60 supplied with the binary coded decimal signals representative of the maximum dose from the maximum dose buffer register 52 for decoding the same to make the numeral display tubes $19_1$ through $19_4$ display the maximum dose. The unit 8 further comprises a first and a second digital-to-analog converter 61 and 62 supplied with the binary digital signals for the coordinate components, respectively, of the individual points on the isodose curves successively from the isodose curve buffer register 53 for converting such signals to analog signals, which are supplied through amplifiers 63 and 64 to deflection coils 65 to deflect the CRT electron base. The unit 8 still further comprises an intensity modulator 66 responsive to the unblanking signals supplied from the computer 6 through the decoder/controller 51 for removing the beam out-off bias voltage after the analog signals representative of the points on the isodose curves are supplied from the digital-to-analog converters 61 and 62 to the deflection coils 65 and, responsive further to the display intensifying signal supplied from the comparator 54, for further raising the bias voltage each time the analog signals representative of the points on the particular at least one of the isodose curves and isocenter area specified by the display intensifying pushbutton switch are delivered to the CRT deflection coils 65.

Figure 6:
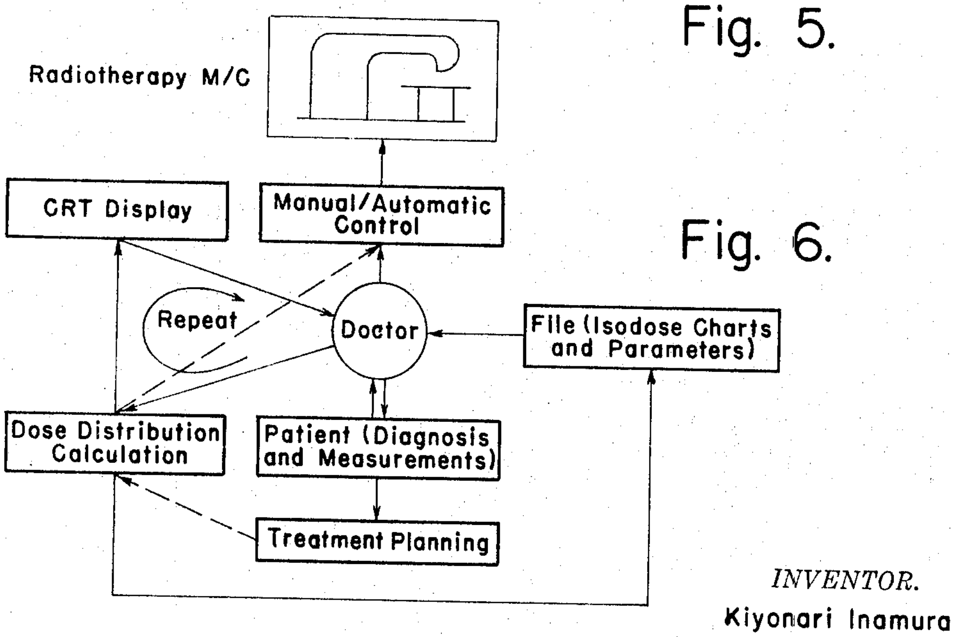
FIG. 6 is a block diagram illustrating how to use the apparatus in radiotherapy.
Figure 7:
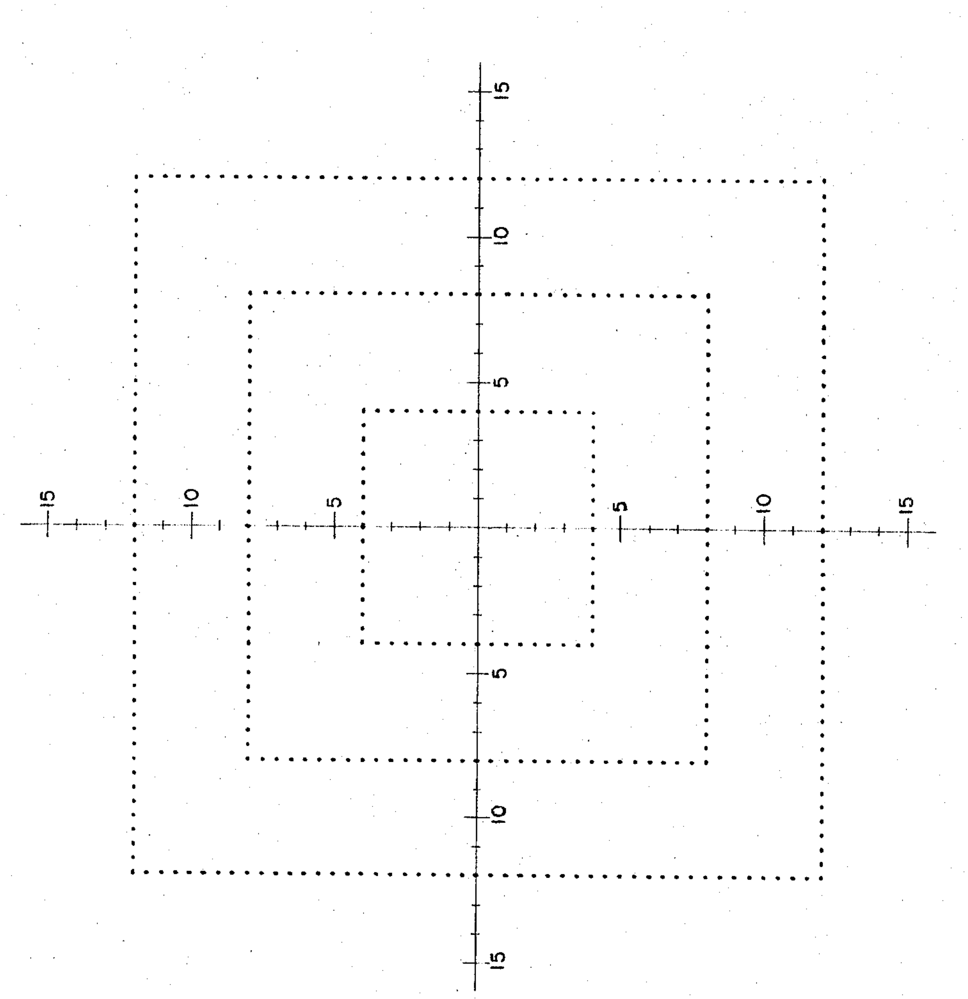
FIG. 7 is a schematic reproduction of the display of a test pattern for calibration of the apparatus.
Figure 8:
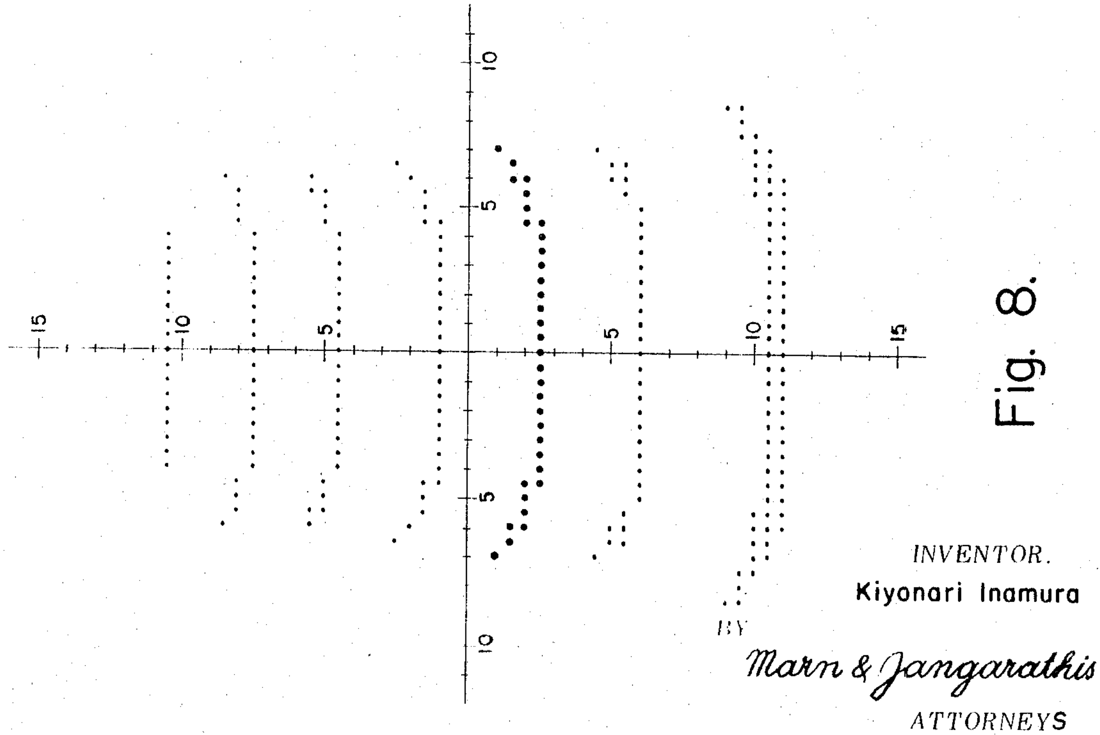
FIG. 8 is a similar reproduction of the display of a set of isodose curves.

Referring to FIG. 6 where the solid lines show the role of the isodose curve display apparatus operatively coupled to the computer and referring further to FIGS. 7 and 8, the doctor determines the radiotherapy machine to be used for the patient and presumes a combination of the parameters as shown by a block labelled "Treatment Planning" through diagnosis and measurements and with reference to the file of isodose charts and parameters, if available, previously obtained by the isodose curve display apparatus. The doctor or an operator couples magnetic tape, on which the program for the selected radiotherapy machine is recorded, to the computer. He sets the presumed parameters by pertinent ones of the digital switches $12_1$ through $12_{118}$ and pushes the start pushbutton switch 15 to start the calculation, with the CRT display unit 8 selected by the first selector switch 14 and with the 100% dose curve intensifying pushbutton $22_1$ depressed, as depicted in FIG. 6 by the block labelled "Dose Distribution Calculation." Within about 3 to 60 seconds, according to the number of the portals, the maximum dose and the isodose curves for the preselected combination of parameters appear on the numeral display tubes $19_1$ through $19_4$ and on the CRT fluorescent screen 18, respectively. It is preferable before start of the calculation operation to effect scale calibration by manipulating the scale calibration switch 21, which produces the test pattern on the fluorescent screen 18 in the manner shown in FIG. 7, and by adjusting the position and the calibration control knobs 23, 24, 27 and 28. The contours of the human body portion, the organ, and the tumor may be displayed on the fluorescent screen 18 by means of the well-known pencil follower (not shown). An example of the isodose curve display is illustrated in FIG. 8 where the 60% isodose curve appears brighter than others. Incidentally, bright spots appearing on the fluorescent screen 18 are depicted with dots in FIGS. 7 and 8.

Figure 9:
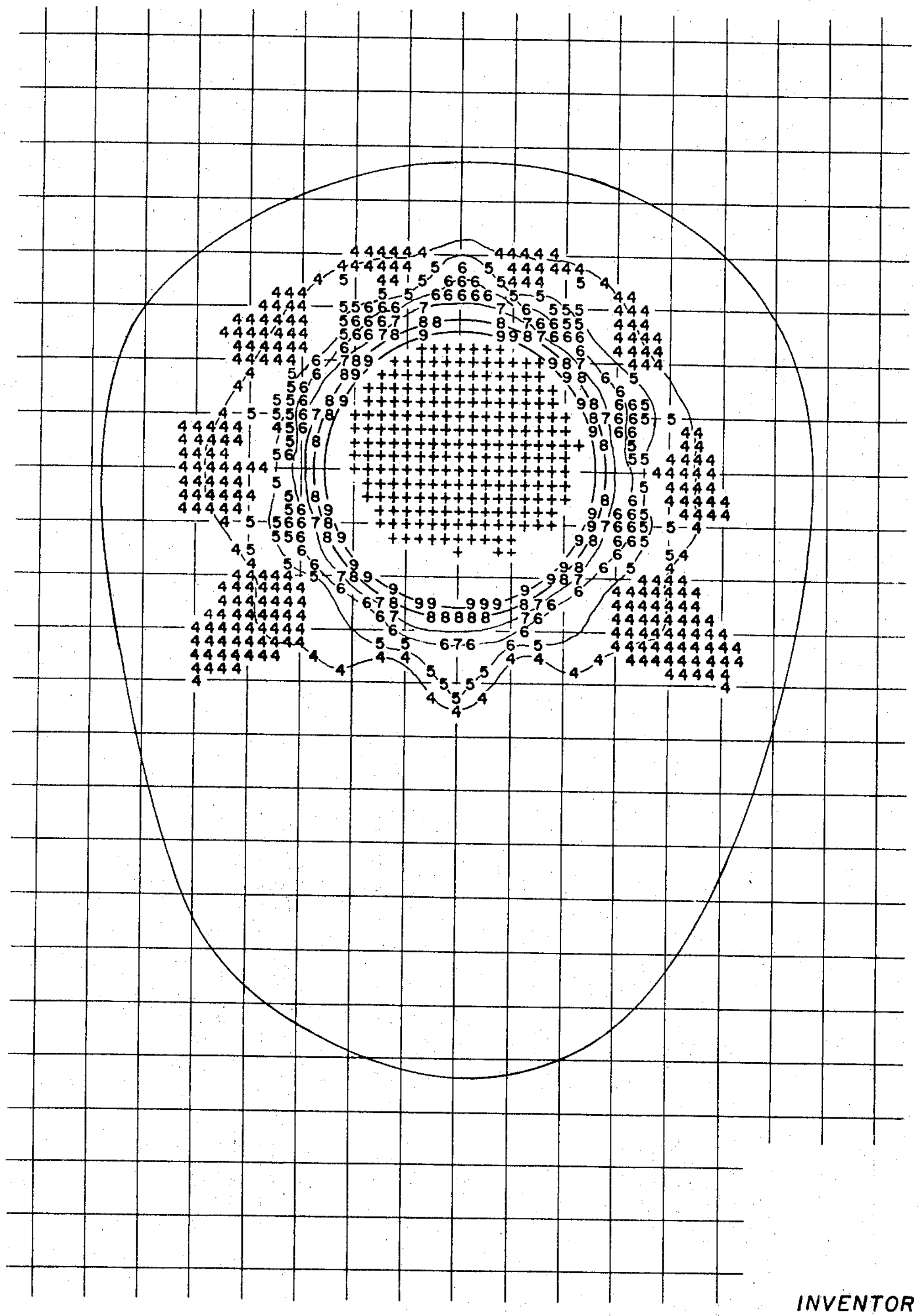
FIG. 9 is a reproduction of a permanent record of the isodose curves.

Referring further to FIGS. 1, 6, and 9, the doctor studies the maximum dose and the isodose curves obtained as above and modifies the settings of some of the digital switches $12_1$ through $12_{118}$ and again depresses the start pushbutton switch 13 to obtain a renewed maximum dose and a group of the renewed isodose curves as illustrated by the broken lines in FIG. 1 and by the C-shaped line labelled "Repeat" in FIG. 6. Repeating such trial and error procedure, the doctor determines the optimum combination of the treatment conditions or the operating parameters for the radiotherapy machine by the set ones of the digital switches $12_1$ through $12_{118}$ within several minutes from the initial setting of the digital switches. The doctor or the operator adjusts the radiotherapy machine in compliance with the optimum treatment conditions and applies radiotherapy to the patient. If he desires, he can switch the first selector switch 14 to obtain the permanent record of the so determined treatment conditions and isodose curves for the file of isodose charts and parameters, as shown in Table 2 and FIG. 9, respectively. It may be possible to adjust the radiotherapy machine automatically in accordance with the settings of the digital switches as indicated in FIG. 6 with a diagonal broken line.

Figure 13:
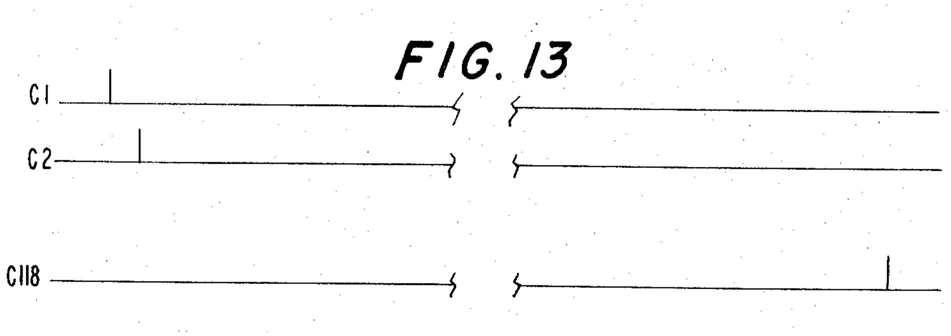
FIG. 13 illustrates wave forms of signals used in the circuit depicted in FIG. 12.
Figure 11:
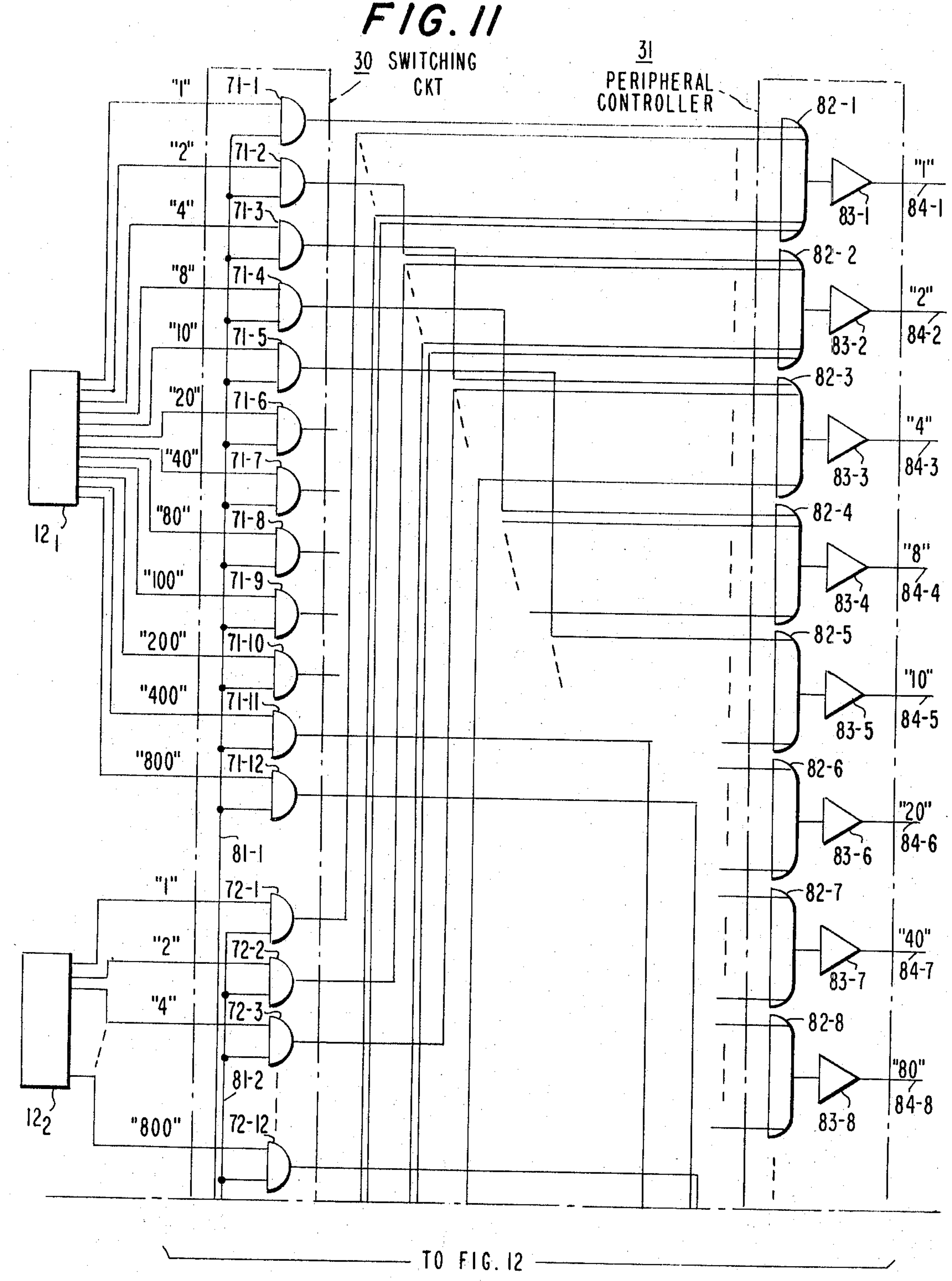
FIGS. 11 and 12, when connected to each other as indicated, show portions of the parameter input unit and the parameter input control unit.
Figure 12:
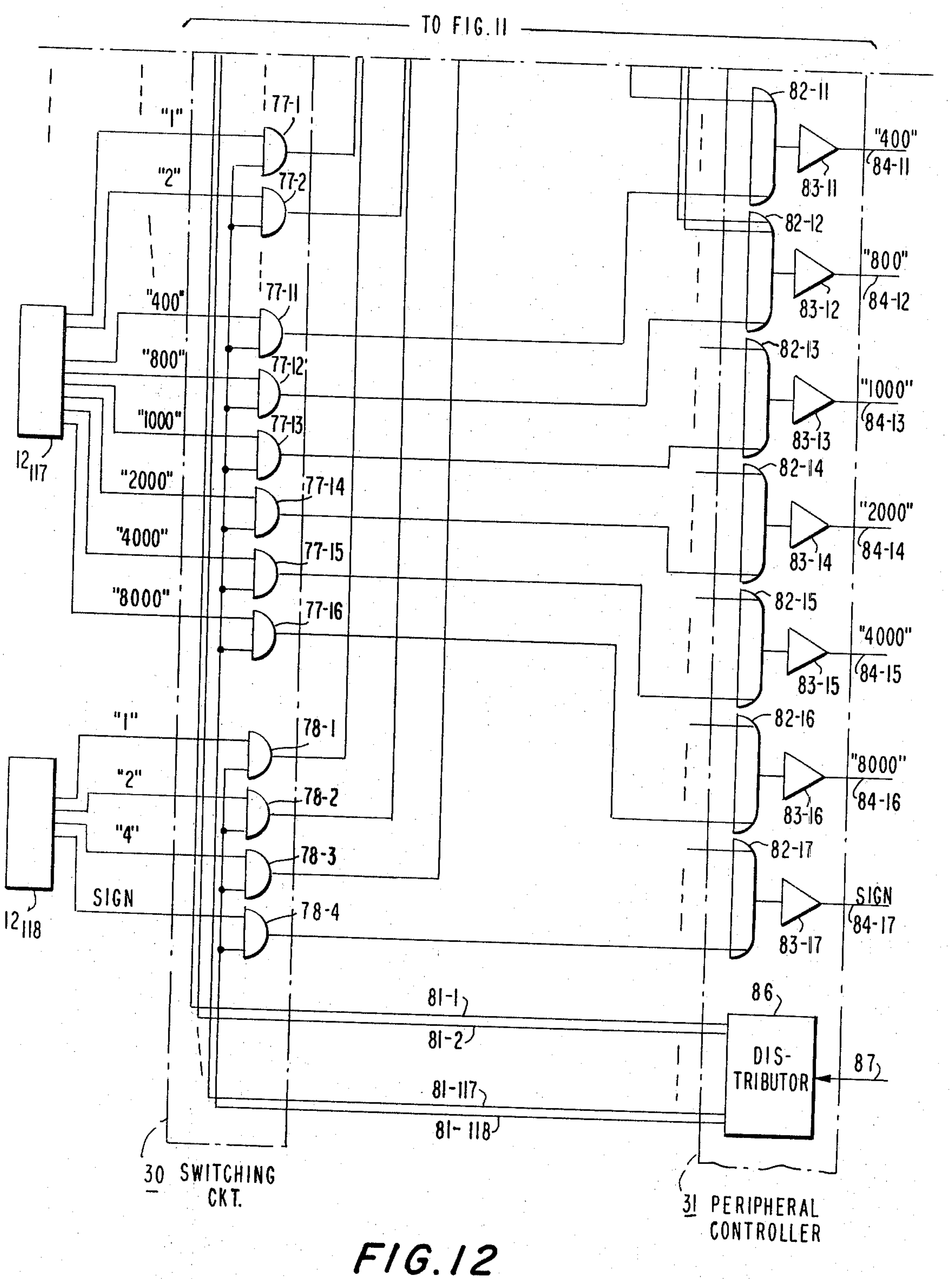

Referring now to FIGS. 11 through 13, the switching circuit 30 of the parameter input control unit 5 comprises a first group of twelve two-input AND gates 71-1 through 71-12, a second group of twelve two-input AND gates 72-1 through 72-12, . . ., a 117-th group of sixteen two-input AND gates 77-1 through 77-16, and a 118-th group of four two-input AND gates 78-1 through 78-4. It is assumed that each of the first and the second digital switches $12_1$ and $12_2$ are for a parameter of three decimal digits, that the 117-th digital switch $12_{117}$ for a parameter of four decimal digits, and that the 118-th digital switch $12_{118}$ is for a parameter of up to four with a sign. First input terminals of the first group AND gates 71-1 through 71-12 are connected to the respective output leads of the first digital switch $12_1$. Similarly, first input terminals of the second through the 118-th group AND gates 72-1 through 78-4 are connected to the respective output leads of the second through the 118-th digital switches $12_2$ through $12_{118}$. It may be that the 118-th digital switch $12_{118}$ is for a parameter of one decimal digit with a sign but that the output lead thereof for the most significant digit is not connected to a like AND gate. All second input terminals of the first group AND gates 71-1 through 71-12 are connected to a first timing signal lead 81-1. Likewise, second input terminals of the second through the 118-th group AND gates 72-1 through 78-4 are connected to a second through a 118-th timing signal leads 81-2 through 81-118. The peripheral controller 31 of the parameter input control unit 5 comprises a first through a seventeeth OR gate 82-1 through 82-17, a first through a seventeeth inverter 83-1 through 83-17 interposed between the respective output terminals of the OR gates 82-1 through 82-17 and seventeen leads 84-1 through 84-17 of the peripheral bus lines (input), and a distributor 86 for distributing 118 parameter flag output pulses, which are successively supplied thereto through a lead 87 of the peripheral control lines in the manner later described, to the timing signal leads 81-1 through 81-118 as a first through a 118-th timing signal C1 through C118 depicted in FIG. 13. Such a distributor 86 will be readily manufactured by those skilled in the art with R-S flip-flop circuits, a diode matrix, and AND gates. Although dependent on the speed of parameter input, each pulse width of the timing signals may be a few microseconds. The time lag between the successive pulses may be several hundred microseconds. The first OR gate 82-1 has 118 input terminals connected to the respective output terminals of the first AND gates 71-1, 72-1, . . ., 77-1, and 78-1 of the first through the 118-th groups. Responsive to the first through the 118-th timing pulses, the first inverter 83-1 supplies the pulses of the least significant digits (represented in FIG. 11 with 1) of the binary coded decimal signals to the first output lead 84-1 in the time-shared fashion. Similarly, each of the second and the third OR gates 82-2 and 82-3 is connected to 118 AND gates 71-2, 72-2, . . ., 77-2, and 78-2 or 71-3, 72-3, . . ., 77-3 (not shown), and 78-3. In compliance with the fact that there is no AND gate for the most significant binary digit of the least significant decimal digit in the 118-th group, the fourth OR gate 82-4 is connected to one hundred and seventeen AND gates 71-4, 72-4 (not shown), . . ., and 77-4 (not shown). In this manner, the input terminals of the fifth through the sixteenth OR gates 82-5 through 82-16 are connected to the output terminals of AND gates, if any, for the fifth (10) through the sixteenth (8000) digits. The input terminals of the seventeenth OR gate 82-17 are connected to the respective output terminals of the AND gates, such as the fourth AND gate 78-4 of the 118-th group, to whose input terminals the binary signals representative of signs are supplied from the associated digital switches. It will now be understood that the binary coded digital signals representative of the parameters set on the parameter input unit 4 are supplied to the computer 6 in a time-division fashion in response to the respective timing signals.

Referring to FIG. 14, the first encoder 32 of the parameter input control unit 5 comprises a first flip-flop circuit ST1 whose set input terminal is connected to the start pushbutton switch 13, a second flip-flop circuit ST2 whose set input terminal is connected to the 1 output terminal of the first flip-flop circuit ST1, a two-input AND gate 91 supplied with the 0 output signal of the first flip-flop circuit ST1 and the 1 output signal of the second flip-flop circuit ST2, a third flip-flop circuit ST3 whose set input terminal is connected to the output terminal of the AND gate 91, and an inverter 92 interposed between the 1 output terminal of the third flip-flop circuit ST3 and a lead 93 of the peripheral control lines. Signals sent from the computer 6 through predetermined ones FO1, FO2 and FO3 of the peripheral bus lines (output) are applicable to the respective reset input terminals of the first through the third flip-flop circuits ST1, ST2, and ST3 to reset the first encoder 32 for subsequent operation. It is obvious to those skilled in this kind of circuits that the first encoder 32 produces a pulse of a predetermined duration even if the time of closure of the pushbutton switch 13 may fluctuate. This pulse of the predetermined duration serves as the interruption signal. Incidentally, the interruption signal is acceptable by most of the present-day digital computers. In the manner known in the computer art, an interruption signal activates the computer 6 to carry out the function generally called the priority interruption, whereby the computer 6 interrupts the execution of the program and initiates execution of a new program specified by the interruption signal.

Further referring to FIG. 14, the second encoder 33 comprises a multi-input AND gate 96 whose input terminals are connected to the first selector switch 14, some of the peripheral bus lines (output) FO1 through FO6, and some of the peripheral control lines FIP, FUD, and FKK. In the example of the second encoder 33 illustrated, the first selector switch 14 derives ground and a positive potential as the CRT display output device selection signal and the permanent record output device selection signal, respectively. The so-called timing signals supplied to the AND gate 96 through the peripheral control lines FIP, FUD, and FKK become "on" (e.g., the signals may be binary 1s or positive voltage levals when the computer 6 executes a "CHECK IF SW 14 IS ON" instruction described hereunder. The signals supplied through the FO1 through FO6 lines except that supplied through the FO1 line become "off" (e.g., the signals may be binary 0s or ground voltage levels) when the "CHECK IF SW 14 IS ON" instruction is executed. If the CRT display unit 5 is selected by the first selector switch 14, the second encoder 33 produces an "off" output signal. If the plotter 9 and the typewriter 10 are selected, the second encoder 33 produces an "on" signal.

Still further referring to FIG. 14, the third encoder 35 of the parameter input control unit 5 comprises a multi-input AND gate 97 whose input terminals are connected to the second selector switch 17, some of the peripheral control lines FUD and FKK, and some of the peripheral bus lines (output) FO1 through FO6. The second selector switch 17 derives ground and a positive potential dependent upon selection of the calculated maximum dose and a preselected dose as the reference dose, respectively. The so-called timing signals supplied to the AND gate 97 through the peripheral control lines FUD and FKK become on when the computer 6 executes a CHECK IF SW 17 IS ON instruction described later. The signals supplied through the peripheral bus lines FO1 through FO6 become off except the signal supplied through the FO2 line when the CHECK IF SW 17 IS ON instruction is executed. If the maximum dose is selected by the second selector switch 17, the third encoder 35 produces an off signal. If the CHECK IF SW 17 IS ON instruction is executed while the preselected dose is selected, the encoder 35 produces an on signal.

Yet further referring to FIG. 14, the peripheral controller 31 of the parameter input control unit 5 comprises a two-input OR gate 98 for delivering the output signals of the second and the third encoders 33 and 35 to one of the peripheral control lines FSS. It is of the known technique to activate the central processor of a digital computer to inquire into which of the two positions each of two-way switches provided on the peripheral units is put, by executing instructions relating to the individual ones of the switches. For example, the conventional computer-controlled teletype device makes use of this technique on inquiring if the switch provided on the teletype machine or the teletypewriter is thrown into the "on line" position or the "local" position. Furthermore, the peripheral control lines FIP, FUD, FKK, and FSS as well as the peripheral bus lines FO1 through FO6 are conventional in the digital computers commercially available on the market, although they may be designated by various names. Those skilled in the computer art may therefore readily adapt the above-described circuitry to various digital computers so as to achieve the equivalent results. It will also be apparent to use other signals as the timing signals applied to the encoders 32, 33, and 35. Incidentally, some of the peripheral bus signals are shown in FIG. 14 to be supplied to the AND gates 96 and 97 as inhibit signals for clarity of illustration. In practice, the inverted signals may be derived in the peripheral controller 31.

Figure 15:
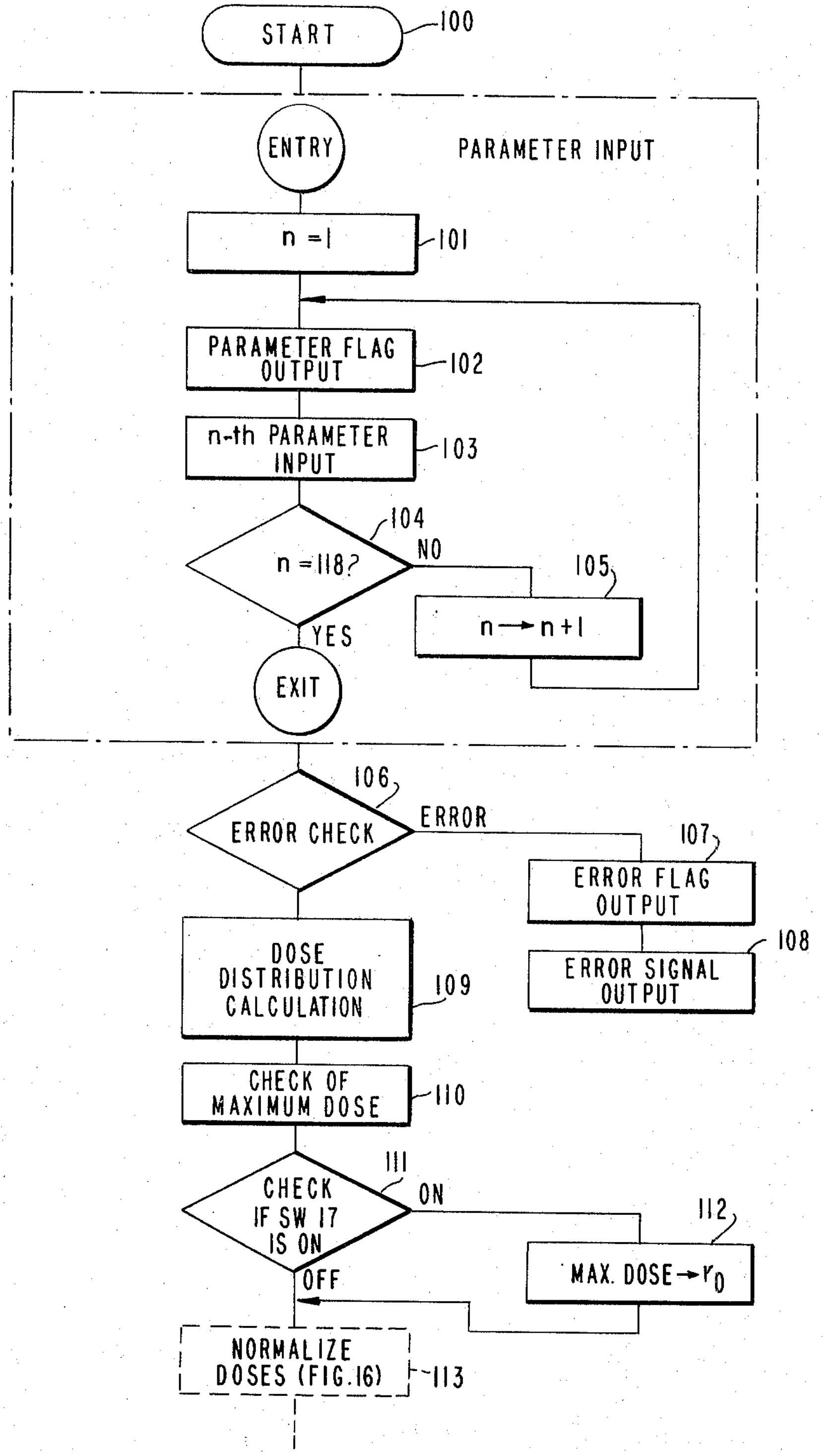
FIGS. 15 and 16, when connected to each other as indicated, illustrates a program for use in operating the computer operatively coupled to the apparatus.
Figures 16, 17:
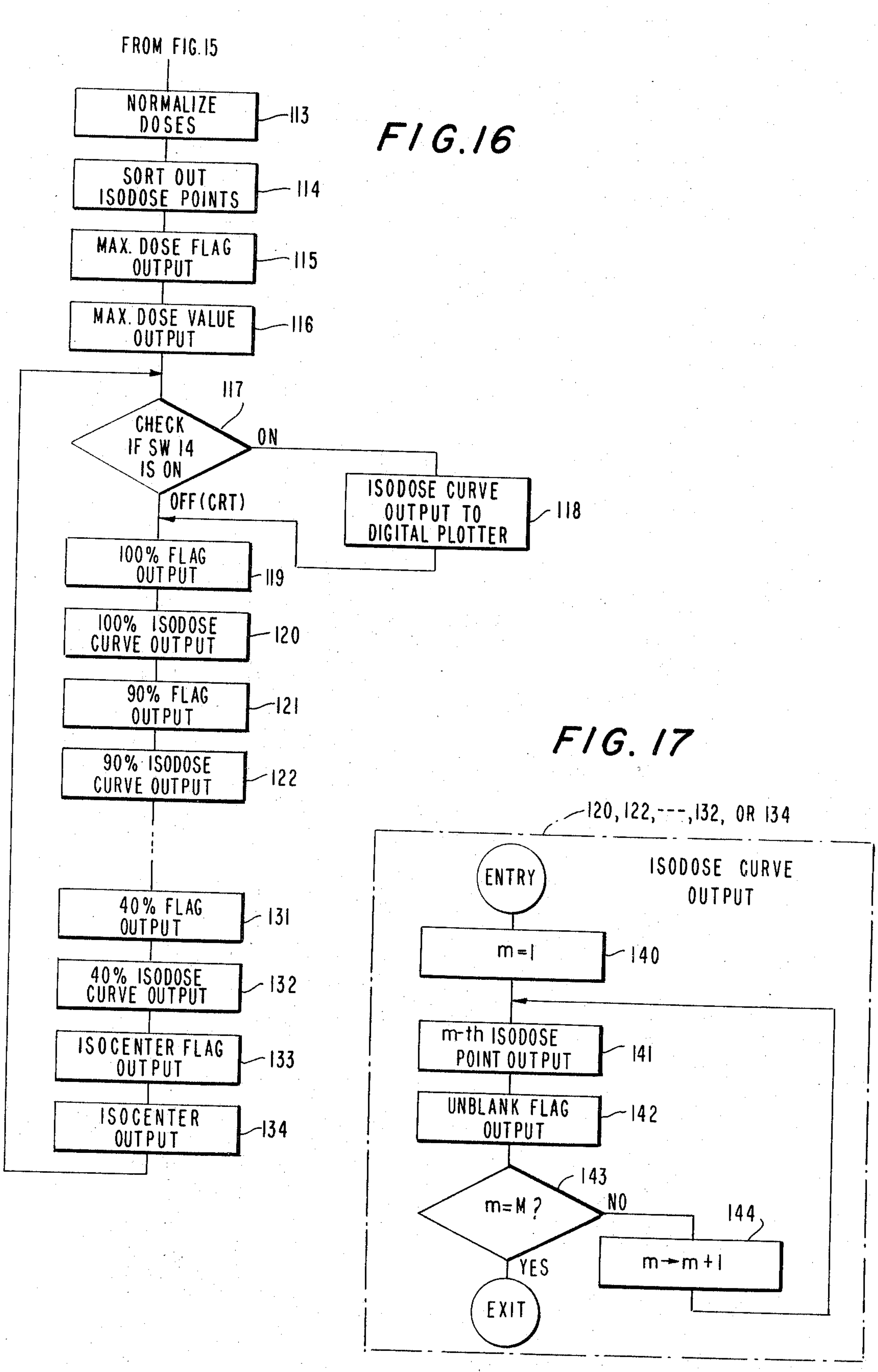
FIG. 17 shows a portion of the program in detail.

Referring to FIGS. 15 and 16, the "Dose Distribution Calculation" mentioned with reference to FIG. 6 begins with manual depression of the start pushbutton switch 13. The interruption signal produced by the first encoder 32 of the parameter input control unit 5 makes the computer 6 execute the program depicted in FIGS. 15 and 16 as indicated at START 100. For convenience of description, it is assumed that the radiotherapy machine is a rotatable X-ray linear accelerator. The computer 6 executes a PARAMETER INPUT subroutine. At the beginning of the subroutine, it is understood that the instructions are for $n = 1$ as noted at 101. The computer 6 executes a PARAMETER FLAG OUTPUT instruction 102 for $n = 1$ to supply a first one of the parameter flag output pulses to the distributor 86 illustrated with reference to FIG. 12 through the lead 87 of the peripheral control lines. In response to this pulse, the parameter input device 4 and 5 delivers to the computer 6 the binary coded decimal signals representative of the parameter, if any, manually set by the first digital switch $\mathbf{12}_1$. The computer 6 executes an "$n$= th PARAMETER INPUT" instruction 103 to make its main memory store these digital signals and then checks, as indicated at 104, if $n = 118$. Inasmuch as $n$ is now equal to 1 rather than 118, the number $n$ is henceforth understood to be 2 as indicated at 105. Responsive to another PARAMETER FLAG OUTPUT instruction 102 and $n$-th PARAMETER INPUT instruction 103, the computer 6 makes the main memory store the binary coded decimal signals representative of the parameter set by the second digital switch $\mathbf{12}_2$. Eventually, the computer 6 makes the main memory store the binary coded decimal signals representative of the parameter set by the 118-th digital switch $\mathbf{12}_{118}$ to subsequently execute an ERROR CHECK instruction 106. It is to be or that the PARAMETER FLAG OUTPUT instructions 102 are not specfic or the computer 6 used in the embodiment and that any one of the digital computers now available on the market is so designed that, upon executing a data input or output instruction, a flag consisting of one or more pulses indicative of the fact is supplied thereby to the peripheral equipment. These instructions are called PERIPHERAL CONTROL AND BRANCH instructions in a NEAC 3100 computer. The $n$-th PARAMETER INPUT instruction, which is also common in digital computers available on the market, is termed a PERIPHERAL DATA TRANSFER instruction in a NEAC 3100 computer. If the computer 6 finds out during execution of the ERROR CHECK instruction 106 that at least one of the parameters is erroneously set by the corresponding digital switch beyond the allowable range exemplified in Table 1, the computer 6 executes in succession an ERROR FLAG OUTPUT instruction 107 and an ERROR SIGNAL OUTPUT instruction 108 to light the corresponding at least one of the indicator lamps, such as $\mathbf{15}_1$ through $\mathbf{15}_{20}$, in the manner already mentioned and detailed later. When the error of errors are indicated, the operator resets the inadvertently set parameter of parameters and then depresses the start pushbutton switch 13 again to re-start the PARAMETER INPUT subroutine and eventually make the computer 6 execute the ERROR CHECK instruction 106. When no error is found, the computer 6 executes a DOSE DISTRIBUTION CALCULATION routine 109.

Upon completion of the DOSE DISTRIBUTION CALCULATION routine 109, the computer 6 executes a CHECK OF MAXIMUM DOSE instruction 110 to search out the maximum value of the calculated doses. The computer 6 now executes a CHECK IF SW 17 IS ON instruction 111 mentioned in conjunction with FIG. 14 to check if the signal received through the FSS line of the peripheral control lines is on or off at the time of execution of this instruction 111. If the signal on the FSS line is on, the computer 6 executes MAX. DOSE → $r_0$ instruction 112 to substitute the reference dose $r_0$ preset by the 117-th digital switch $\mathbf{12}_{117}$ for the calculated maximum dose and then NORMALIZE DOSES instruction 113. When the signal on the FSS line is off, the computer executes the NORMALIZE DOSES instruction 113 at once. In any event, the calculated doses are normalized with reference either to the preset reference dose $r_0$ or to the calculated maximum dose into percentages. The computer 6 executes SORT OUT ISODOSE POINTS instruction 114, whereby the coordinates on the 100%, 90%, . . . , and 40% isodose curves are searched out with reference to the sampling band $e$ of curves set by one of the digital switches and further to the mesh intervals $d$U and $d$V similarly set and are pooled in the main memory according to the percentages together with the number of the isodose points of the respective percentages. Subsequently, the computer 6 executes a MAX. DOSE FLAG OUTPUT instruction 115 and a MAX. DOSE VALUE OUTPUT instruction 116 to produce binary coded decimal signals representative of the maximum dose and to make the numeral display tubes $\mathbf{19}_1$ through $\mathbf{19}_4$ display the maximum dose in the manner already mentioned and to be described hereunder in detail. The computer 6 now executes a CHECK IF SW 14 IS ON instruction 117 mentioned in connection with FIG. 14 to check if the signal on the FSS line is on or off at this moment. When the signal on the FSS line is on, the computer 6 executes an ISODOSE OUTPUT TO DIGITAL PLOTTER instruction 118 to direct the output signals to the permanent record output device 9–10. When the signal on the FSS line is off, the output signals are directed to the CRT display output device 7–8. In either case, the central processor of the computer 6 now executes a 100% FLAG OUTPUT instruction 119 and a 100% ISODOSE CURVE OUTPUT instruction 120, a 90% FLAG OUTPUT instruction 121 and a 90% ISODORE CURVE OUTPUT instruction 122, . . . , a 40% FLAG OUTPUT instruction 131 and a 40% ISODOSE CURVE OUTPUT instruction 132, and an ISOCENTER FLAG OUTPUT instruction 133 and an ISOCENTER OUTPUT instruction 134. When the CRT display unit 8 is selected by the first selector switch 14, these instructions 119 through 134 form a series of instructions for making the CRT display output device 7–8 display the isodose curves and the isocenter. The computer 6 repeatedly executes the series of instructions 119 through 134. Thus, one frame of the isodose curve display is carried out by the CRT display output device 7–8 each time a series of the instructions 119 through 134 are executed. The frequency of execution of this series or loop determines the frame rate of the CRT display. The actual frame rate, which depends on the persistency of the CRT fluorescent screen 18, may be 20 frames per second.

Turning now to FIG. 17, each of the ISODOSE CURVE OUTPUT and ISOCENTER OUTPUT instructions 120, 122, . . . , 132, and 134 is a subroutine illustrated herein. At the outset, a pair of coordinates to be produced is understood to be the pair for a first one of the isodose points or the isocenter points as indicated by $m=1$ at 140. Responsive to an $m$-th ISODOSE POINT OUTPUT instruction 141, the central processor of the computer 6 produces binary digital signals representative of the U and the V coordinates of the first isodose or isocenter point. As has already been mentioned and will later be described more in detail, the buffer register 53 for the isodose curves and isocenter points stores the binary digital signals for application to the deflection coils 65 of the CRT display unit 8. The computer 6 now executes an UNBLANK FLAG OUTPUT instruction 142 to produce an unblanking pulse for displaying the first isodose or isocenter point on the fluorescent screen 18 of the CRT display unit 8. As indicated at 143, the computer 6 checks if the number $m$ of the isodose or isocenter points thus far displayed is equal to the number M of the isodose points of the percentage being dealt with or the isocenter points which has been calculated and pooled in the main memory during execution of the SORT OUT ISODOSE POINTS instruction 114. If the number $m$ is less than M, the computer 6 produces a reset signal to supply the binary digital signals representative of the next isodose point or of the next isocenter point as indicated at 144. It is to be noted that it takes a finite time for the current flowing through the deflection coils 65 to reach steady state. The finite time of the example being illustrated is about 50 microseconds. The unblanking pulse should be produced after the finite time.

Figure 18:
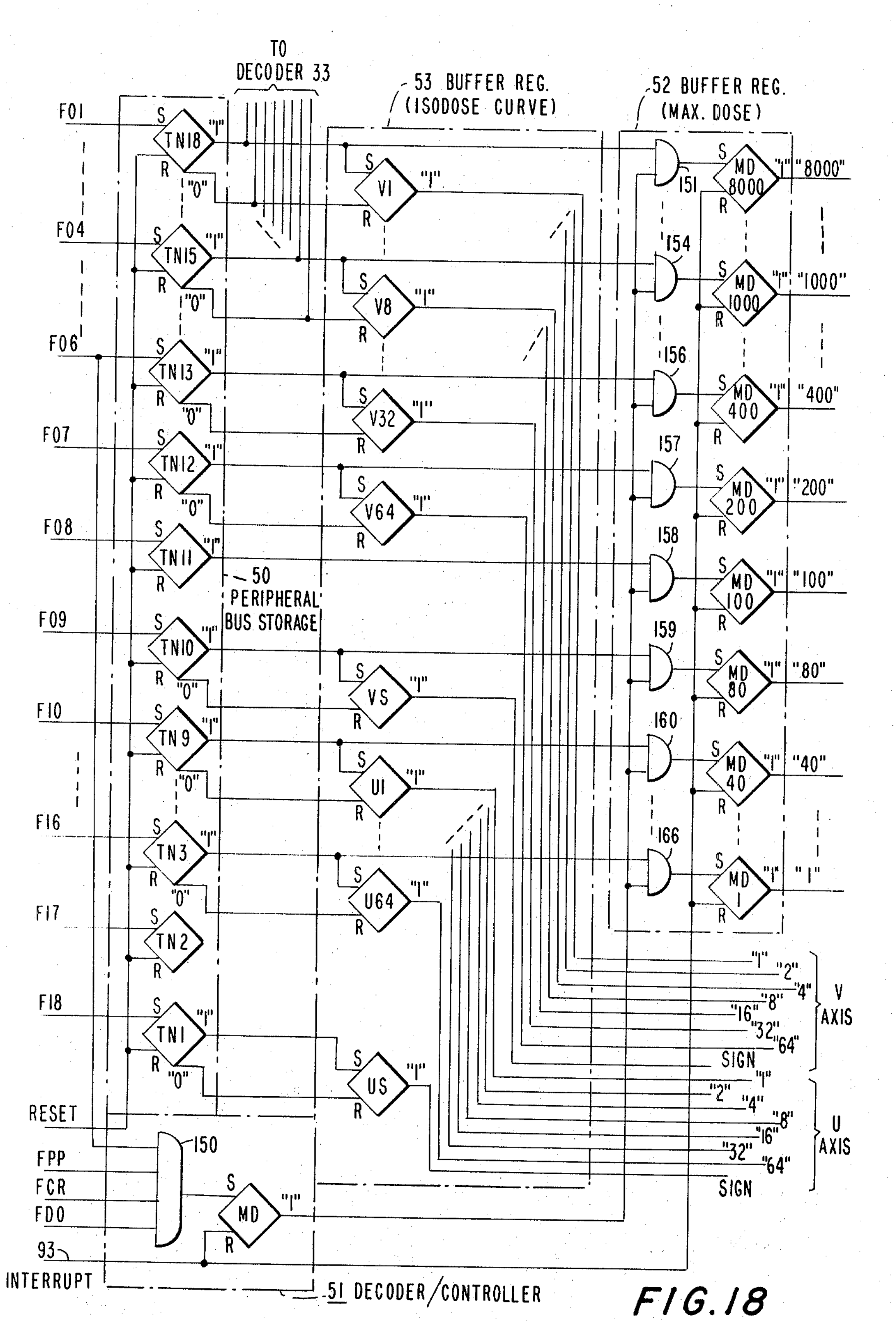
FIG. 18 shows a portion of the CRT display control unit.

Referring to FIG. 18, the peripheral bus storage 50 comprises eighteen R-S bus flip-flop circuits TN1 through TN 18 whose set input terminals S are connected to peripheral output bus leads F18, F17, F16, . . . , F10, F09, F08, F07, F06, . . . , F04, . . . , and F01, respectively. Each time the MAX. DOSE VALUE OUTPUT instruction 116 is executed, the computer 6 sends the binary coded decimal signals representative of the maximum dose on the leads F01 through F16. When each of the 100% ISODOSE CURVE OUTPUT, 90% ISODOSE CURVE OUTPUT, . . . , 40% ISODOSE CURVE OUTPUT, and ISOCENTER OUTPUT instructions 120, 122, . . . , 132, and 134 is executed, the computer 6 successively produces the binary digital signals representative of the U and V coordinates of the isodose points of the specified percentage or the isocenter points on the F18 through F10 and F09 through F01 leads except the F17 and the F08 leads. These data are memorized in the respective flip-flop circuits TN1 through TN18 until a reset signal is supplied to their reset terminals R. A portion of the decoder/controller 51 comprises a four-input AND gate 150 supplied with the signals on one peripheral but line F06 and three peripheral control lines FPP, FCR, and FDO. The portion further comprises a maximum dose flag R-S flip-flop circuit MD set by the output signal of the AND gate 150 and reset by the interruption signal supplied through the extension of the lead 93 of the peripheral control lines. It should be recalled that the MAX. DOSE FLAG OUTPUT instruction 115 is executed prior to the MAX. DOSE VALUE OUTPUT instruction 116, whereupon the signals supplied to the AND gate 150 are all turned on. The flip-flop circuit MD therefore produces a logic 1 signal. The buffer register 52 for the maximum dose comprises sixteen AND gates 151, . . . , 154, . . . , 156 through 160, . . . , and 166, each having a first and a second input terminal, and sixteen maximum dose value R-S flip-flop circuits MD8000, . . . , MD1000, . . . , MD400, MD200, MD100, MD80, MD40, . . . , and MD1 whose set terminals S are connected to the output terminals of the AND gates 151, . . . , 154, . . . , 156 through 160, and 166, respectively, and whose reset terminals R are supplied with the interruption signal. The first input terminals of the AND gates 151, . . . , 154, . . . , 156 through 160, . . . , and 166 are connected to the 1 output terminals of the bus flip-flop circuits TN18, . . . , TN15, . . . , TN13 through TN9, . . . , and TN3, respectively. The second input terminals of these AND gates 151 through 166 are supplied with the 1 output signal of the maximum dose flag flip-flop circuit MD. The logic 1 signal produced by the flip-flop circuit MD makes the AND gates 151 through 166 deliver the binary coded decimal signals representative of the maximum dose to the maximum dose value flip-flop circuits MD1 through MD8000 to be stored therein until the start pushbutton switch 13 is depressed afresh. The buffer register 53 for the isodose curves comprises eight U axis R-S flip-flop circuits U1, . . . , U64, and US set and reset by the 1 and the 0 output signals of the respective flip-flop circuits TN9, . . . TN3, and TN1 and eight V axis R-S flip-flop circuits V1, . . . , V8, . . . , V32, V64, and VS connected to the 1 and the 0 output terminals of the respective flip-flop circuits TN18, . . . , TN15, . . . , TN13, TN12, and TN10. While each of the isodose curves and the isocenter is displayed, the reset signals sent from the computer 6 renews the binary digital signals previously stored in the peripheral bus storage flip-flop circuits TN1 through TN18 to a new set of binary digital signals representative of the next isodose or isocenter point as described with reference to FIG. 17.

Figure 19:
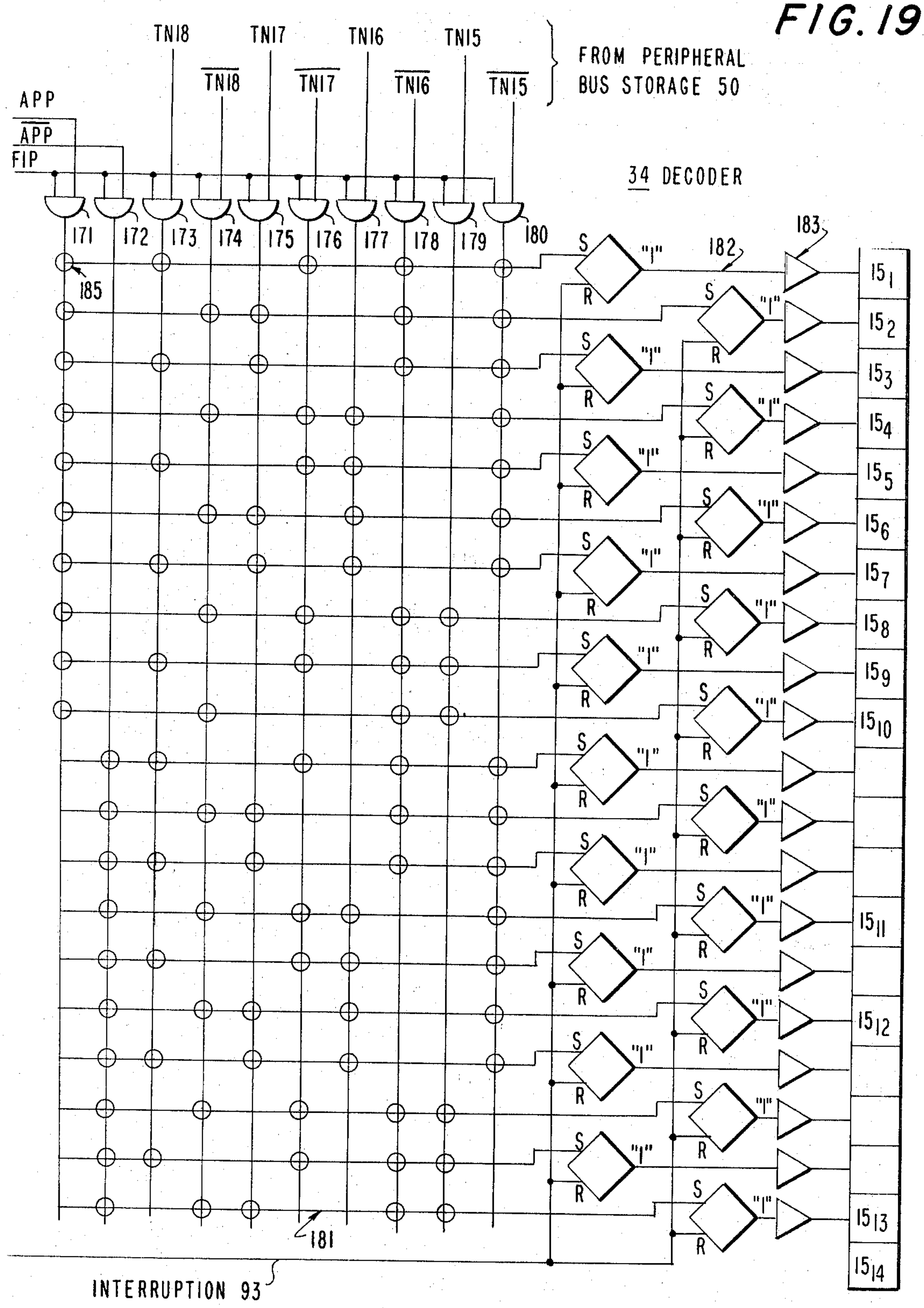
FIG. 19 shows portions of the parameter input unit and the parameter input control unit.

Referring to FIG. 19, the decoder 34 of the parameter input control unit 5 comprises ten AND gates 171 through 180, each having a first and a second input terminal, a diode matrix 181 having ten column conductors connected to the respective output terminals of the AND gates 171 through 180 and a plurality of row conductors, a like plurality of R-S flip-flop circuits generally indicated by 182 whose set terminals S are connected to the respective row conductors, and an equal number of amplifiers generally designated by 183 for supplying amplified 1 output signals of the flip-flop circuits 182 to the error indicator lamps, such as $15_1$ through $15_{20}$. The first input terminals of the AND gates 171 through 180 are connected to two peripheral control lines APP and $\overline{APP}$ and to the 1 and the 0 output terminals of four of the peripheral bus storage flip-flop circuits TN18 through TN15, respectively. The second input terminals of the AND gates 171 through 180 are connected to one of the peripheral control lines FIP. The diode matrix 181 comprises diodes generally represented by 185 interconnecting the cross points of the column and the row conductors as shown. The reset terminals R of the flip-flop circuits 182 are supplied with the interruption signal. If the computer 6 finds an error in the parameters set by the digital switches when the computer 6 executes the ERROR FLAG OUTPUT instruction 107, the signal on the peripheral control line FIP turns on to make the decoder 34 respond to the output signals of the bus flip-flop circuits TN18 through TN15. In the example being illustrated, the computer 6 turns the signals on the true peripheral control line APP and the peripheral output bus line F01 on when at least one error is found in the parameters of the first portal. The fact is indicated by the first error indicator lamp $15_1$. Subsequently, the computer 6 turns the signal on the peripheral control line APP off. If the tenth parameter, which is the width $w_0$ of the shielding block, is in error, the computer 6 turns the signals on the peripheral output bus lines F02 (not shown) and F04 on to light the corresponding error indicator lamp $15_{13}$. In this manner, the error or errors are indicated by the corresponding indicator lamp or lamps until the start pushbutton switch 13 is again depressed. It is again to be understood that the peripheral control lines, such as FIP, and the flag signal produced prior to indication of the errors are in principle common to most commercially available digital computers although the names and the number of the control signals may differ and the instructions may be either explicit or implicit, and therefore, those skilled in the computer art could readily adopt any one of the digital computers to operate in the manner described above.

Figure 20:
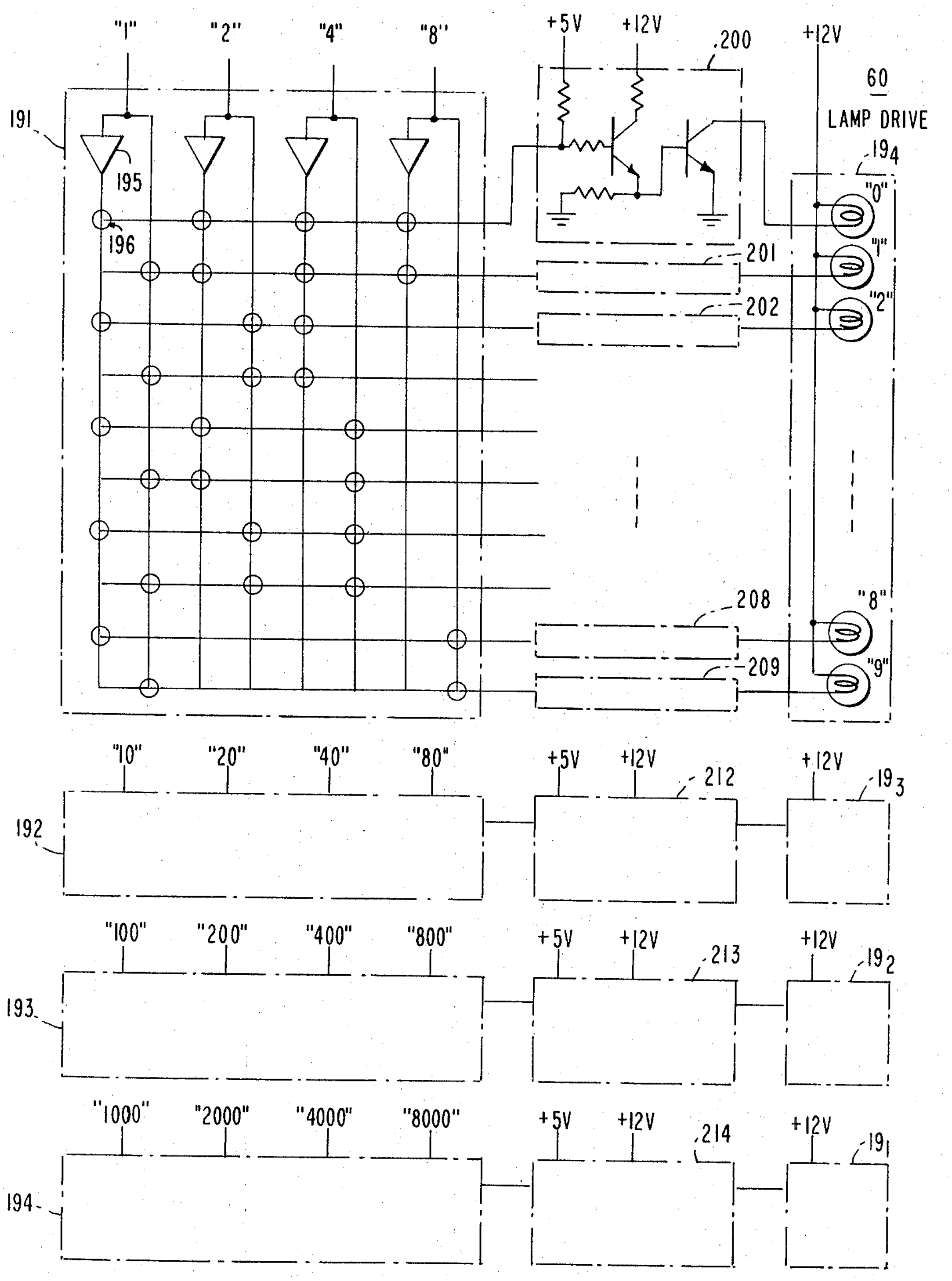
FIG. 20 shows a portion of the CRT display unit.

Referring to FIG. 20, the lamp driver 60 of the CRT display unit 8 comprises a first diode matrix 191 supplied with the 1, 2, 4, and 8 output signals of the buffer register 52 for the maximum dose, a second diode matrix 192 supplied with the similar output signals of the ten's place, a third diode matrix 193 supplied with the like output signals of the hundred's place, and a fourth diode matrix 194 supplied with the corresponding output signals of the thousand's place. Each of the binary coded decimal signals, signals 1 through 8000 is supplied to a pair of column conductors directly and through an inverter generally indicated at 195. Each of the diode matrices 191 through 194 comprises ten row conductors and diodes, generally designated by 196, interconnecting the column and the row conductors as shown. The lamp driver 60 further comprises a first group of a zeroth through a ninth driver 200 through 209 interposed between the zeroth through the ninth row conducors of the first diode matrix 191 and the zeroth through the ninth lamps 0 through 9 of the least significant decimal digit numeral display tube $19_4$, respectively, a second group 212 of drivers similarly interposed between the second diode matrix 192 and the ten's place numeral display tube $19_{13}$, a third group 213 of like drivers, and a fourth group 214 of similar drivers. It will be easily seen that the diode matrices 191 through 194 each converts a set of the binary coded decimal signals into a set of decade digital signals to make the numeral display tubes display the maximum dose and that the circuitry of the lamp driver 60 is readily designed by those skilled in the art from its function previously described.

Figure 21:
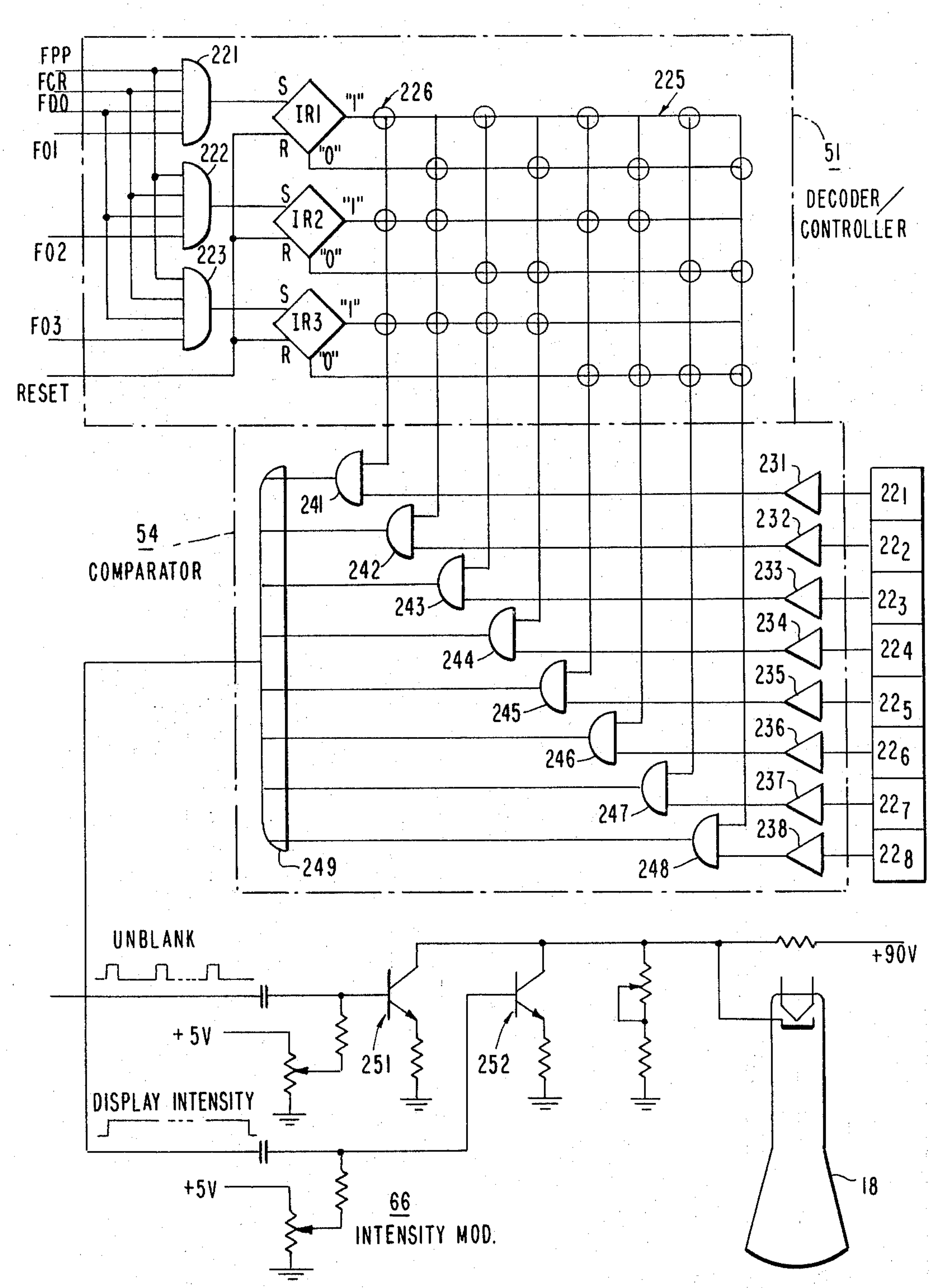
FIG. 21 shows portions of the CRT display control unit and the CRT display unit.

Referring to FIG. 21, the remaining portion of the decoder/controller 51 of the CRT control unit 7 comprises a first AND gate 221 supplied with three signals on the peripheral control lines FPP, FCR, and FDO and the signal on one of the peripheral output bus lines F01, a second AND gate 222 supplied with the three signals and the signal on another of the peripheral output bus lines F02, and a third AND gate 223 supplied with the three signals and the signal on the peripheral output bus line F03. As described with reference to FIG. 18, the signals on the peripheral control lines FPP, FCR, and FDO turn on when the MAX. DOSE FLAG OUTPUT instruction 115 is executed. When the 100% FLAG OUTPUT, the 90% FLAG OUTPUT, . . . , the 40% FLAG OUTPUT, and the ISOCENTER FLAG OUTPUT instructions 119, 121, . . . , 131 and 133 are executed, the signals on the peripheral output bus lines F01, FO2, and E03 turn on and off in the manner given in Table 3 to make the AND gates 221 through 223 produce binary digital signals encoded accordingly. The decoder/controller 51 further comprises a first through a third R-S flip-flop circuit IR1, IR2, and IR3 set by the output signals of the corresponding AND gates 221, 222, and 223 and reset by the reset signal and a diode matrix 225 comprising six row conductors connected to the 1 and 0 output terminals of the flip-flop circuits IR1 through IR3, eight column conductors, and diodes generally indicated by 226 interconnecting the row and the column conductors as shown. It is now understood Table 3

| Instruction | | F01 | F02 | F03 |
|---|---|---|---|---|
| "100% FLAG OUTPUT" | 119 | ON | ON | ON |
| "90% FLAG OUTPUT" | 121 | off | ON | ON |
| "80% FLAG OUTPUT" | | ON | off | ON |
| "70% FLAG OUTPUT" | | off | off | ON |
| "60% FLAG OUTPUT" | | ON | ON | off |
| "40% FLAG OUTPUT" | 131 | ON | off | off |
| "ISOCENTER FLAG OUTPUT" | 133 | off | off | off |

that when the 100% FLAG OUTPUT, 90% FLAG OUTPUT, . . . , 40% FLAG OUTPUT, and ISOCENTER FLAG OUTPUT instructions 119 through 133 are executed, the signals on the first, the second, . . . , and the eight column conductors as counted from the left are turned on, respectively. As repeatedly mentioned, it is common to the digital computers available on the market to specify the meanings of the data, such as the data of the 100% isodose points, transferred from the central processor to any peripheral equipment, such as the CRT display output device 7–8, by the respective combinations of the signals on the peripheral control lines and on the peripheral output bus lines. It is also easy for those skilled in the art to make any one of the digital computers carry out, albeit implicitly, the 100% FLAG OUTPUT instruction 119 and the like flag output instructions.

Further referring to FIG. 21, the comparator 54 of the CRT control unit 7 comprises a first through an eight amplifier 231 through 238 connected to the respective display intensifying pushbutton switches $22_1$ through $22_8$, a first through an eighth AND gate 241 through 248, each having a first and a second input terminal, and an OR gate 249 supplied with the output signals of the AND gates 241 through 248. The first input terminals of the AND gates 241 through 248 are connected to the first through the eighth column conductors of the diode matrix 225. The second input terminals of the AND gates 241 through 248 are connected to the respective amplifers 231 through 238. It will now readily be acknowledged that the comparator 54 compares the successively produced percentage/isocenter signals supplied thereto through the column conductors with the signals produced by depression, as desired, of at least one of the intensifying pushbutton switches to produce a display intensifying signal each time there is a counterpart of the former signal in the latter signals.

Still further referring to FIG. 21, the intensity modulator 66 of the CRT display unit 8 comprises a transistor circuit 251 responsive to the unblank signal of the pulse form which the computer 6 produces on executing the UNBLANK FLAG OUTPUT instructions 142. Again, those skilled in the art may readily adopt the computer 6 to produce, on delivering a data signal to a peripheral equipment, a pulse signal to the peripheral equipment indicative of the delivery of the data signal. The pulse duration may be readily determined. In the example being illustrated, the duration of the unblanking pulse is about two microseconds. The intensity modulator 66 further comprises another transistor circuit 252 for intensifying the birghtness of the desired at least one of the displays of the isodose curves and of the isocenter.

Finally, it is possible to write the program of the DOSE DISTRIBUTION CALCULATION routine 109 described in conjunction with FIG. 18, along the lines of manual calculation, based on the following formulae:

$$R(U,V) = \sum_{i=1}^{N} r_i A(A_{Wi}) L(L_i) [F/(F-d_i)]^2 P(y_i) [Q(x_i) + T(x_i)]/100$$

and $$\begin{bmatrix} x_i \\ y_i \end{bmatrix} = \begin{bmatrix} G_{1i} & G_{2i} \\ G_{3i} & G_{4i} \end{bmatrix} \begin{bmatrix} U \\ V \end{bmatrix},$$

where $G_{1i} = \cos A_{Ii}$, $G_{2i} = \sin A_{Ii}$, $G_{3i} = \sin A_{Ii} - \cos A_{Ii}(\tan A_{Wi} + \tan A_{Oi}/2)$, and $G_{4i} = \cos A_{Ii} - \sin A_{Ii}$ $(\tan A_{Wi} + \tan A_{Oi}12)$;

$i$, $R(U, V)$, $P(Y_i)$, and $Q(x_i)$ represent the portal number, the dose absorbed at a point $(U, V)$, the depth dose curve, and the flatness curve, respectively; and $A(A_{Wi})$, $L(L_i)$, $[F/(F-d_i)]$, and $T(x_i)$ are correction factors for the wedge filter angle, the field size, the distance between the source and the isocenter $F$ and between the skin and the isocenter $d_i$, and the shielding block, respectively.

What is claimed is:

1. Apparatus for displaying a predetermined number of isodose curves representative of respective doses of radiation to be absorbed by an object within an area of a coordinate plane preselected in said object, and for selecting a particular plurality of said parameters for operating a selected radiation source placed at least at one preselected spacial relation relative to said object, said apparatus comprising:

an input device adapted to be set in compliance with a combination of values of such operating parameters and to generate second digital signals representative thereof, an electronic digital computer coupled to the output of said input device and operable in compliance with input signals and a program associated with a preselected radiation source to produce output signals, said output signals being representative of the coordinates of a plurality of quantized points at which said doses are to be absorbed by said object, and said input signals including said second digital signals and first digital signals representative of parameters for calculations including a step size for quantizing the points on said coordinate plane; and a display output device operatively coupled to said computer and responsive to said output signals for visually displaying said isodose curves,

2. Apparatus in accordance with claim 1 further comprising a permanent record output device to be coupled to said computer and responsive to said output signals for recording said isodose curves and said operating parameters on a recording medium, said input device including a first selector switch for selecting one of said display output device and said permanent record output device to which said computer should supply said output signals.

3. Apparatus in accordance with claim 1, said operating parameters and said parameters for calculation having their respective allowable ranges, wherein said input device includes a plurality of manually operable switches for setting said operating parameters and said parameters for calculation thereon, respectively, and a plurality of indicator members assigned to said operating parameters and said parameters for calculation, each of said indicator members capable of indicating the presence of an error in at least one of the operating parameters and the parameters for calculation assigned thereto in response to an error signal produced by said computer in compliance with the program when said at least one of the operating parameters and the parameters for calculation is set on said input device by the corresponding at least one of said manually operable switches beyond the allowable range for said at least one of the operating parameters and the parameters for calculation.

4. Apparatus in accordance with claim 3 wherein said radiation source is a rotatable X-ray linear accelerator, and wherein said operataing parameters comprise the number of portals through which said radiation is to be directed to said object, the size of a field of said object that is perpendicular to the direction of said radiation to be directed to said object through each of said portals and at which the last-mentioned radiation is to be absorbed, an integrated dose of said radiation to be absorbed by each of the fields during the whole duration of said radiation, the distance between said linear accelerator and the surface of said object adjacent to said linear accelerator for each of said portals, the thickness of said object in the direction of said radiation for each of said portals, the angle formed between each of said field and a predetermined one of orthogonal coordinate axes of said coordinate plane, and the angle formed between the tangent to said object at the surface and the direction of said radiation for each of said portals and said parameters for calculation comprise the scope of said area, the coordinates of the origin of said area, said step size, and that range of the doses to be absorbed by said object which is to be represented by each of said isodose curves.

5. Apparatus in accordance with claim 3, wherein one of said manually operable switches is for setting on said input device a reference dose based on which said isodose curves should be displayed and said input device comprises a second selector switch for selectively making said computer, when operatively coupled to said input device, produce output signals representative of the coordinates of the isodose curves based on said reference dose.

6. Apparatus in accordance with claim 1 further comprising a predetermined number of manually operable display intensifying switches for specifying said isodose curves, respectively, said display output device comprising means responsive to manual operation of at least one of said display intensifying switches for intensifying the visual display of at least one of said isodose curves that corresponds to said at least one of said display intensifying switches.

7. Apparatus for displaying the distribution of radiation to be absorbed by an object, said radiation being produced by a selected radiation emission device, comprising:

input means having digital switches for generating digital signals representative of the operating parameters of said radiation emission device and the characterizing feature of said object, each of said digital switches comprising a plurality of wheels independently manually rotatable to generate a digital signal representing one of said operating parameters or charaterizing features associated with said digital switch, said one operating parameter or characterizing feature comprising a number of digits equal to the number of wheels included in said digital switch;

data processing means coupled to said input means and responsive to said digital signals for determining in a predetermined manner associated with said radiation emission device the distribution of radiation to be absorbed by said object; and display means coupled to said processing means for visually displaying said distribution of radiation determined by said processing said display means comprising a cathoderay tube responsive to signals representing the distribution of radiation determined by said data processing means for displaying a predetermined number of isodose curves associated with said object, each of said isodose curves representing a discrete amount of radiation to be absorbed by said object in accordance with said digital signals generated by said input means.

8. Apparatus for displaying the distribution of radiation to be absorbed by an object in accordance with claim 7 and further comprising numeral display means responsive to said signals representing the distribution of radiation determined by said data processing means for displaying the maximum radiation dose associated with said object, said maximum radiation dose representing the maximum amount of radiation to be absorbed by said object in accordance with said digital signals generated by said input means.

9. Apparatus for displaying the distribution of radiation to be absorbed by an object in accordance with claim 7 and further comprising a plurality of manually operable switches equal in number to said isodose curves for intensifying at least one of said isodose curves that corresponds to an operated one of said manually operable switches.

10. Apparatus for displaying the distribution of radiation to be absorbed by an object in accordance with claim 7 wherein said operating parameters and said characterizing features admit of predetermined allowable ranges, and further comprising indicator means associated with said digital switches for indicating those digital switches that have been manually operated to exceed their respective predetermined allowable ranges.

* * * * *